United States Patent
Inoue et al.

(12)

(10) Patent No.: US 6,512,887 B2
(45) Date of Patent: Jan. 28, 2003

(54) FLASH LAMPS FOR UNDERWATER PHOTOGRAPHY PROVIDED WITH TARGET LIGHT AND CONTROL METHODS AND DEVICES THEREFOR

(76) Inventors: Akihide Inoue, 3-9-6 Dai, Kamakura, Kanagawa 247 (JP); Yoshiyuki Takematsu, 8-8-14-303 Nishigotanda, Shinagawa-ku, Tokyo 141 (JP)

(*) Notice: Subject to any disclaimer, the term of this patent is extended or adjusted under 35 U.S.C. 154(b) by 0 days.

(21) Appl. No.: 09/916,131

(22) Filed: Jul. 25, 2001

(65) Prior Publication Data

US 2002/0001463 A1 Jan. 3, 2002

(30) Foreign Application Priority Data

Feb. 15, 2001 (JP) .......................... 2001-038110

(51) Int. Cl.$^7$ .......................... G03B 17/08; G03B 15/03
(52) U.S. Cl. .......................... 396/28; 396/267; 396/431
(58) Field of Search .......................... 396/28, 106, 157, 396/431, 267; 348/81

(56) References Cited

U.S. PATENT DOCUMENTS 4,777,501 A * 10/1988 Caimi et al. .................. 396/28
5,628,034 A * 5/1997 McIntyre ................. 396/431 X
6,154,610 A * 11/2000 Inoue et al. .................. 396/28

* cited by examiner

Primary Examiner—W. B. Perkey
(74) Attorney, Agent, or Firm—Beyer Weaver & Thomas LLP

(57) ABSTRACT

A flash lamp for underwater photography for use in combination with a camera has a target light, which may be a laser diode or a focussed LED and is set so as to emit a beam of light coaxially with its flash light source such that the user can visually ascertain where the lamp will illuminate. The lamp is controlled such that the target light is automatically switched off or made darker approximately simultaneously as the shutter of the camera is opened. If the flash lamp is of a kind which undergoes preliminary flash light emission prior to main flash light emission, the target light is controlled so as to be switched off or made darker by using the preliminary light emission as the trigger. If the camera is of a kind that outputs a ready signal when its shutter is pressed to a half-way position to indicate that it is ready to be clicked completely, the ready signal may be used as the trigger for switching off or darkening the target light.

32 Claims, 19 Drawing Sheets

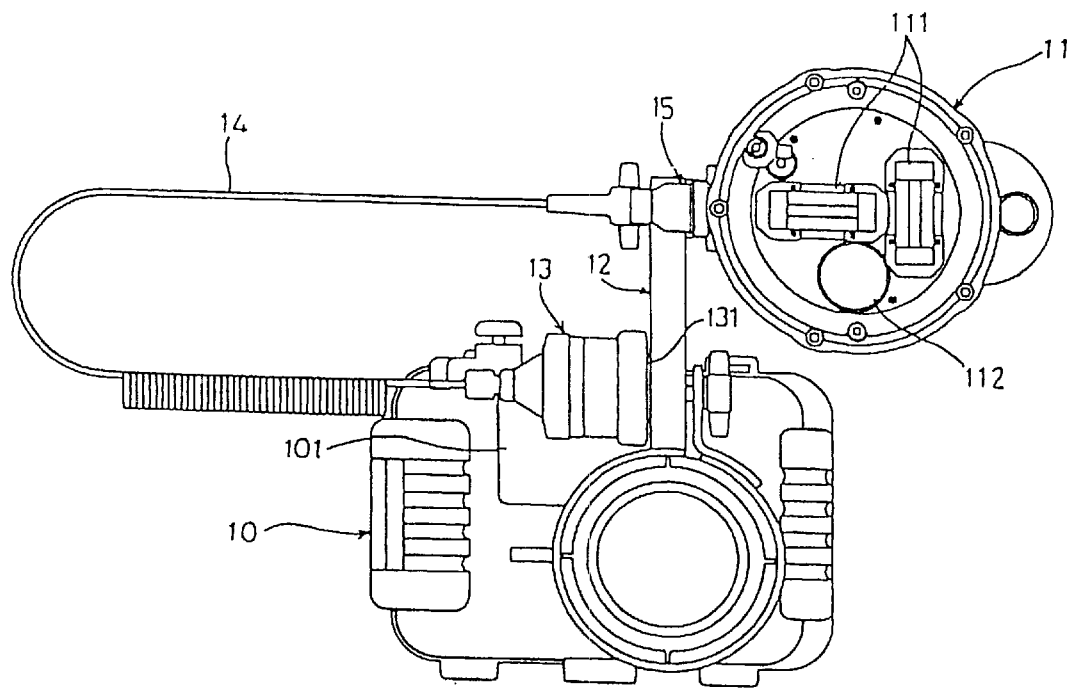
FIG. 19
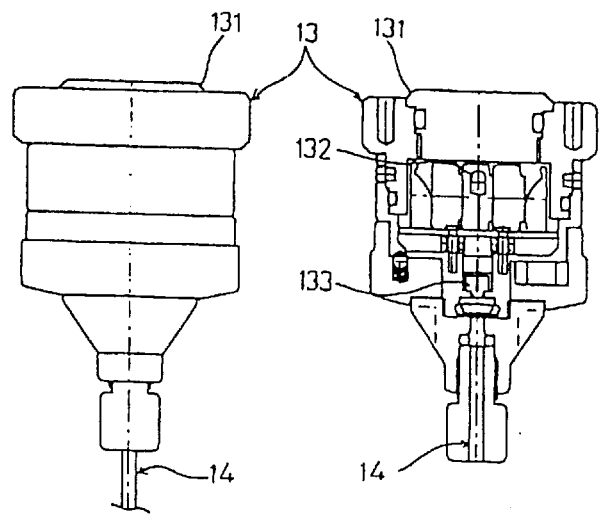
FIG. 20A  FIG. 20B

FLASH LAMPS FOR UNDERWATER PHOTOGRAPHY PROVIDED WITH TARGET LIGHT AND CONTROL METHODS AND DEVICES THEREFOR

BACKGROUND OF THE INVENTION

This invention relates to a flash lamp for underwater photography provided with a so-called target light (to be defined more precisely below), as well as methods and devices for controlling the emission of light from such a target light.

For underwater photography, divers have been carrying along a single-lens reflex camera inside a water-proof housing together with a group of exchange lenses, but a flash lamp is nearly indispensable in underwater photography both because red light is more easily absorbed by water to cause a color imbalance and because there is usually not enough natural light available. As shown in FIG. 1, an underwater flash lamp 90 is usually attached to a camera 91 by means of a flexible arm 92 and is positioned away from the camera 91. One of the reasons for this is that the axis of emitted light from the flash lamp 90 must be displaced (both in terms of position and angle) from the optical axis of the camera 91 because there are usually many small objects such as plankton and grains of same floating inside the water around the underwater photographer. If the flash lamp 90 were set near the camera 91, its light would be strongly reflected by these small objects in front of the target object intended to be photographed and the resulting picture would look like that of a snow scene. Another reason is that underwater photography depends nearly entirely on the light from the flash lamp and hence the position and orientation of the flash lamp should be freely changeable, depending on the desired light condition as well as that of the target object to be photographed.

In underwater photography, the position and orientation of the flash lamp 90 at the end of the flexible arm 92 are adjusted after each exposure in order to get ready for the next opportunity. At the same time, the photographer must check whether the flash lamp 90 is indeed pointing in the direction of the target object to be photographed. Since the visual sense of distance is different in the underwater condition from that in the above-water condition, it is a troublesome work to adjust and check the direction of the optical axis of an underwater flash lamp.

Experienced underwater photographers have learned to attach a penlight 94, as shown in FIG. 1, in order to make this work somewhat easier. Since the penlight 94 is preliminarily attached to the flash lamp 90 such that their optical axes coincide approximately, the underwater photographer can predict the reach of the optical axis of the flash lamp 90 by switching on the penlight 94. This method of attaching a penlight, however, has the following problems:

(1) With the penlight attached, the underwater camera system as a whole becomes bulkier and heavier;
(2) The flux of light emitted from the penlight tends to expand and is likely to be sensed by the fish, which will react and swim away;
(3) Since the flux of light emitted from the penlight expands, it becomes weak by the time it reaches the neighborhood of the target object to be photographed and its direction cannot be ascertained easily by the photographer wearing a goggle;
(4) The penlight requires a bulb with a large output power so as to be effective in the underwater environment and this adversely affects the useful lifetime of the batteries;
(5) Since the batteries for the penlight and for the flash lamp have different lifetimes, it is troublesome to dependably manage them of both; and
(6) It is troublesome to control its operation because it must be switched off before the camera is clicked so as to prevent the light from the penlight from entering the camera.

Although underwater flash lamps incorporating a small light source inside are coming to be available, they can merely serve to simplify the management of batteries somewhat and the problems listed above are mostly unsolved.

Since the underwater photographer usually remains in one position and waits for a right moment to click the shutter while looking into the finder through the goggle, it is desirable to be able to ascertain the condition of the flash lamp without changing the body position and while continuing to look through the finder. In general, the condition of the camera of an underwater photography system (say, a single-lens reflex camera) can be ascertained by means of a display marker which is made visible inside its finder. Since the condition of the flash lamp cannot generally be ascertained merely by looking into the finder, the photographer will have to change the body position, even if temporarily, in order to turn around the system as a whole for checking the display of an LED, for example, on the side surface of the flash lamp for displaying the charge condition, etc. There is usually a current at the site of underwater photography, and the ground condition may not be convenient for the photographer to stand up comfortably or to keep the body in balance. Thus, a heavy labor is involved in moving around the equipment and changing the body position, and an extreme care must be taken.

When a digital camera placed inside a waterproof housing is used for underwater photography, a flash lamp is sometimes attached to the exterior of the housing because such a housing is likely to interfere with the light from an internally provided flash lamp and the amount of effective light may be thereby diminished. In such a case, a light source, not the flash lamp itself, is sometimes used for assisting the user in focussing the camera because a digital camera is sometime more difficult to focus that a single-lens reflex camera. Such a light source may also serve the purpose of allowing the user to ascertain the position of the target object to be photographed or of illuminating the target object to be photographed for making its image on a liquid crystal display device brighter. Throughout herein, such a light source, not a flash lamp, provided for these and other purposes are referred to, in a broad sense of the expression, as a target light.

FIG. 2 shows an example of timing chart for the control of light emission from such a light source (the target light) for a flash lamp adapted to emit flash light preliminarily first and then for the second time as the main emission. When the shutter button is clicked, the flash lamp undergoes a preliminarily light emission before the shutter is opened and the reflected light is instantaneously measured for determining the quantity of light to be projected by the main emission. In this example, the target light remains turned on until the shutter is opened and is switched off in synchronism with the signal through the so-called X-contact (that is, the point where a signal for opening the shutter is transmitted), that is, simultaneously with the starting of the main emission of the flash lamp. If the flash lamp is of the type which undergoes only the main light emission (or the so-called "autostroboscopic" or "flashmatic-type"), there is no preliminary emission and the main emission is adapted to be carried out with a suitable exposure. In this case, too, the target light is switched off in synchronism with a signal through the X-contact.

This prior art method of controlling the timing for switching off a target light has the following problem. Since the shutter for a digital camera operates more slowly than that of an ordinary single-lens reflex camera (indicated by the slope of the curve for the shutter position in FIG. 2), digital cameras are designed, in view of the fluctuations in the time required for the shutter to open completely, such that the X-contact will be switched on slightly after the shutter is completely opened. As a result, it sometimes happens that the target light stays switched on even after the shutter has begun to open until the main emission from the flash lamp is started (shown as time period $t_a$ in FIG. 2), allowing its light to enter the camera through its lens and adversely affecting the quality of the picture taken.

SUMMARY OF THE INVENTION

It is an object of this invention to provide an improved flash lamp for underwater photography with which the problem of setting its optical axis and checking its conditions can be obviated such that the photographer's work in setting and checking the optical axis of the flash lamp, for example, becomes much simpler and underwater photography becomes much easier.

It is another object of the invention to provide a control method and device for controlling the target light for a camera for underwater photography such as a digital camera in a waterproof housing such that light therefrom can be effectively prevented from entering the camera before it is switched off.

A flash lamp embodying this invention, with which the first of the objects of this invention described above can be achieved, may be characterized generally as comprising not only a discharge tube of a known kind for emitting flash light but also a target light such as a laser diode or a well-focussed LED and a control means for automatically switching off the target light approximately simultaneously as the shutter of the camera attached to the flash lamp is opened. Merits of a flash lamp provided with such a target light, as ascertained experimentally by the present inventors, include the following:

(1) A beam from such a target light remains well focussed even in water and can reach several tens of meters without becoming dispersed;

(2) Since a beam of light from such a well-focussed source can travel a long distance without dispersing, the user can clearly ascertain the direction of its propagation;

(3) Since a beam of light from such a target light is narrowly focussed, it is usually ignored by the fish to be photographed;

(4) A narrowly focussed beam from such a target light is not sensed by the fish being aimed at even if it is received by its eye;

(5) A narrowly focussed beam from such a target light is not dispersed much inside water and remains as a spot light even at a long distance and hence can be easily observed by the user even through a goggle; and (6) A narrowly focussed beam from such a target light is not dispersed much inside water and remains a strongly focussed spot light even in the neighborhood of a distant object to be photographed and hence can be effective for the focussing of the camera, whether it is by an automatic focussing mechanism or even by manual focussing by the user.

With a flash lamp using a conventional penlight as a target light, it seldom is a problem if the target light remains on when the shutter of the camera is opened because brightness of the flash light is much greater than that of the penlight. With a flash lamp embodying this invention with a laser diode or a focussed LED serving as the target light, experiments by the inventors showed that a spot may appear on the resulting picture if the target light remains switched on when the shutter is opened for the exposure. Thus, flash lamps embodying this invention must include means for automatically switching off the target light approximately simultaneously as the shutter is opened. As will be explained below, however, this synchronism between the time to open the shutter and the time to turn off the target light need not be exact, and this gives a certain degree of freedom in the circuit design within this limiting requirement.

It is preferable to use a highly convergent light source such as a laser diode as the target light because it can form a spot light sufficiently small compared to the target object to be photographed such as a fish. Experiments by the inventors showed that it was possible to point the target light from a flash lamp embodying this invention on a fish to be photographed without alarming it. Ordinary laser light pointers for use in a lecture hall are designed such that the pointed spot be visible by many persons attending the lecture and hence its diameter is usually designed to be about 10 mm. For the purpose of the present invention, the spot light on the target object to be photographed is only for the user to see. The diameter of the spot light at the position of the target object to be photographed is therefore designed to be no greater than several mm.

Eyes of a fish are usually protruding from the head such that a wider angle of vision is had. By contrast, light from a laser diode is very narrow and is believed not easily recognized by a fish. Tests were carried out by the present inventors by intentionally aiming the beam from a laser diode on the fish's eyes by moving it around to cover an extended area to stimulate the fish. Tests were also carried out by changing color of the emitted light. As a result of such series of tests, it was ascertained that the size of the area of the spot light is an important factor.

A flash lamp embodying this invention is further characterized as comprising one or more of the following mechanisms for switching on the target light:

(1) a mechanism for switching on the target light approximately simultaneously as when the flash lamp has been charged;

(2) a mechanism for switching on the target light when the shutter button of the camera for opening its shutter has been pushed in by the user to a half-way position and a signal indicative of this condition (referred to as the "half-pushed-in signal" or the "ready signal") has been thereby generated and is received by the mechanism; and (3) a mechanism for switching on the target light by a timer, or in response to a timer signal generated by a timer and received by the mechanism.

With one or more of such mechanisms provided, the user has only to switch on the power switch on the flash lamp. Since the target light is turned on semi-automatically thereafter when any of the conditions described above comes to be satisfied, the user has only to wait, for example, until a colored spot light becomes visible through the finder of the camera. In other words, the user is no longer required to change the body position to learn the condition in which the flash lamp is (that is, whether it has been charged and where it is pointed) and can concentrate on the next picture to be taken. The timer, referred to above, need not be of the ordinary kind for measuring time but may be any of various circuit units having a timer-like function such as a so-called one-shot multi-vibrator circuit which remains in a switched-on condition for several to several tens of seconds when a trigger signal is received by the gate switch.

A flash lamp according to a preferred embodiment of the invention may be further adapted to be operable in an energy-saving mode, being provided with one or both of the following mechanisms:

(1) an energy-saving mechanism for switching on the target light after the flash lamp has been charged and the half-pushed-in signal has been received; and (2) an energy-saving mechanism for switching on the target light after the flash lamp has been charged and when a timer signal has been received from a timer.

The water temperature is usually low at the site of underwater photography and the heat generated by the electrical circuits and the light-emitting components is quickly conducted away. Under such a low-temperature condition, the dry cell batteries cannot function as effectively and power tends to be wasted quickly. An energy-saving mode of operation, therefore, is an important feature of this invention. The conditions related to the energy-saving mechanisms mentioned above are not substantially different from those for ordinary systems for above-ground use. Thus, users will not find them unfamiliar and will be able to become used to them quickly.

Signals exchanged between the flash lamp and the camera to which it is connected may be at least in part optical signals transmitted through an optical signal cable. Use of an optical signal cable to connect the flash lamp with the camera is advantageous because the connecting parts are not damaged by the invasion of water.

A method embodying this invention, with which the second of the aforementioned objects can be accomplished, may be characterized, if the flash lamp is of the kind adapted to undergo both preliminary flash light emission and main flash light emission, as comprising the step of darkening (including switching off) the target light to a darkened condition (including an totally extinguished condition) by using the preliminary flash light emission as a trigger before the shutter of the camera begins to open. The target light is then kept in the darkened condition at least until the shutter is closed. If the flash lamp is of the kind adapted to undergo only the main flash light emission without any preliminary flash light emission, the so-called ready signal which may be outputted when the shutter button is pressed to a half-way position, is used as the trigger.

A device embodying this invention, with which the second of the aforementioned objects can be accomplished, may be characterized, if the flash lamp is of the kind adapted to undergo both preliminary flash light emission and main flash light emission, as comprising control means for darkening the target light to a darkened condition by using the preliminary flash emission as a trigger before the shutter begins to open. The control means will further serve to keep the target light in the darkened condition at least until the shutter is closed. If the flash lamp is of the kind adapted to undergo only the main flash light emission without any preliminary flash light emission, detecting means is provided for detecting a so-called ready signal which may be outputted when the shutter button of the camera is pressed to a half-way position and outputting a detection signal when the ready signal is detected and a control means serves to darken the target light when this detection signal is received.

BRIEF DESCRIPTION OF THE DRAWINGS

FIGS. 12 and 13 are timing charts for explaining a method of controlling light emission embodying this invention;

FIG. 19 is a front view of a system for underwater photography incorporating flash lamps embodying this invention;

FIGS. 20A and 20B are respectively an external view and an internal view of the light detector shown in FIG. 19;

Throughout herein, components which are alike or equivalent may be indicated by the same numerals or symbols for the sake of simplicity even where they are components of different devices and may not be repetitiously described.

DETAILED DESCRIPTION OF THE INVENTION

Figure 3A:
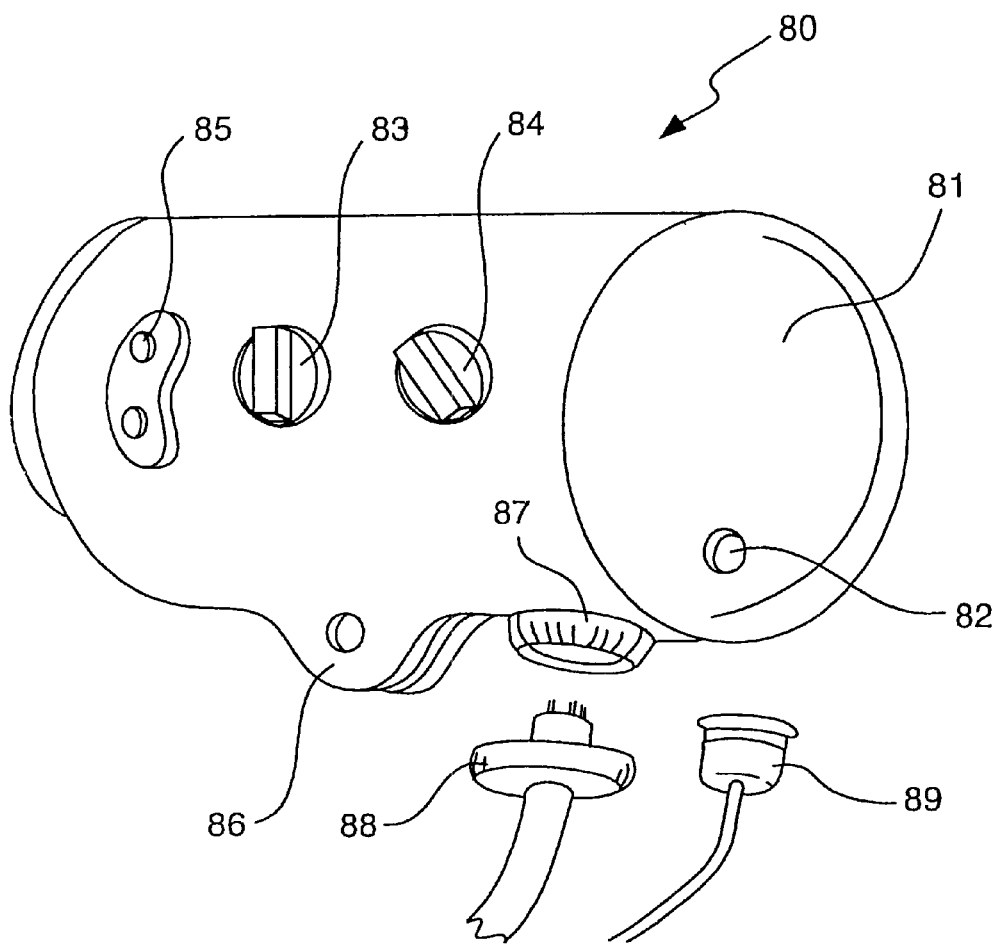
FIG. 3A is a schematic external view of a flash lamp embodying this invention, incorporating a target light.
Figure 3B:
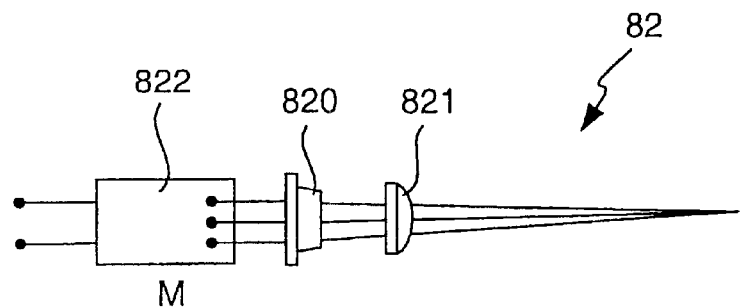
FIG. 3B is a schematic drawing for showing the structure of the target light unit which may be incorporated in the flash lamp of FIG. 3B, FIGS. 3A and 3B being hereinafter together referred to as FIG. 3.

FIG. 3A shows a flash lamp 80 for underwater photography, embodying this invention and being characterized as comprising not only a discharge tube 81 for emitting flash light but also a laser diode unit 82 serving as a target light such that their optical axes coincide. The laser diode unit 82 thus incorporated may be of the kind commonly used as a pointer in a lecture hall, comprising, as shown schematically in FIG. 3B, a laser diode 820, a lens 821 and a monitor circuit (M) 822, to be explained below. Since the laser diode is a semiconductor laser which can be formed as a small electronic circuit, it is not only small and light but also energy-saving. It is believed to have never been done to incorporate such a laser device in a compact underwater device for popular use, not a large-scale industrial system.

Figure 4:
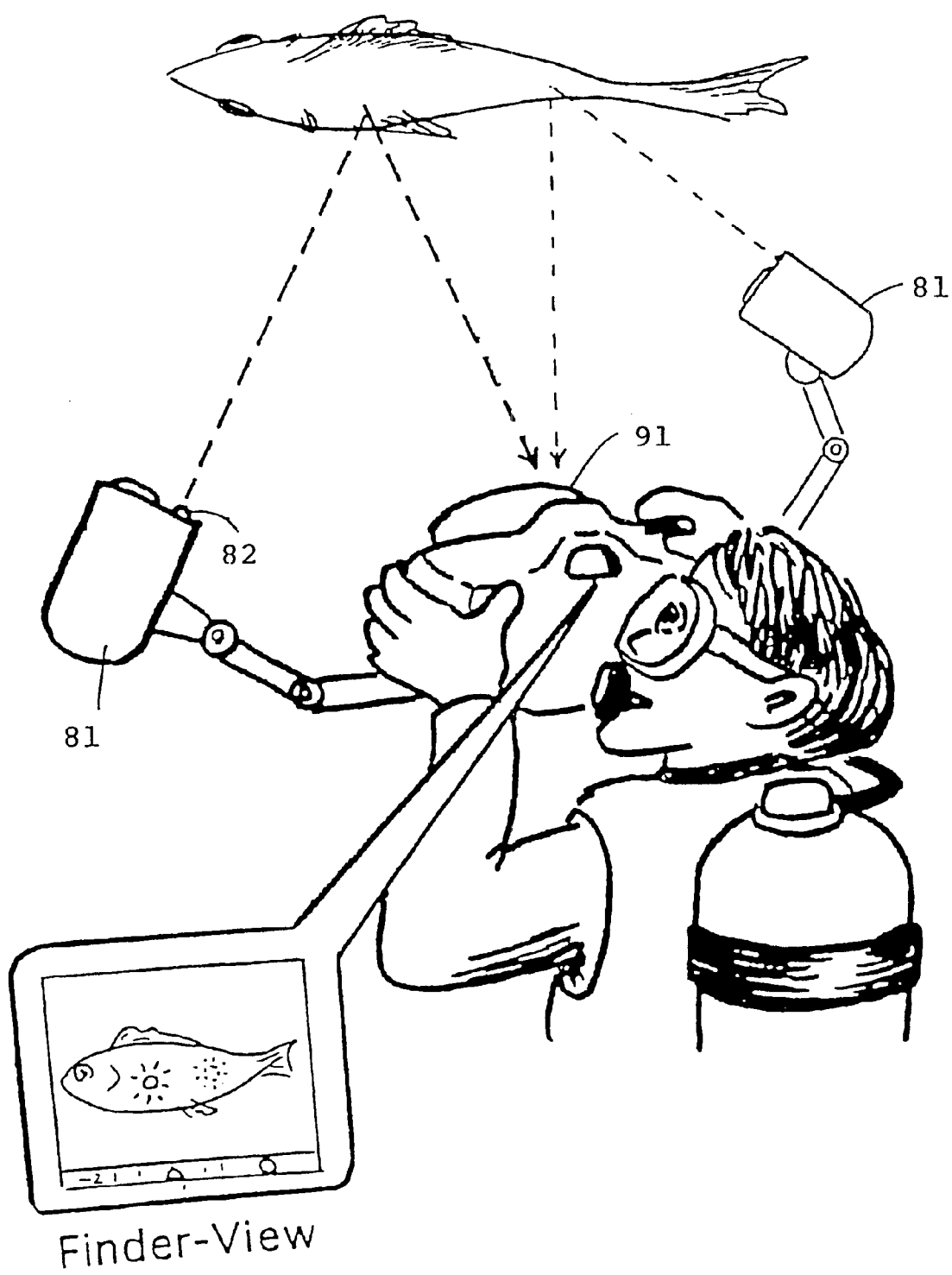
FIG. 4 is a schematic drawing for showing how a user sees a spot (or spots) illuminated by a target light (or target lights) through the finder of an underwater camera.

Although not separately shown, the target light may comprise an LED, especially of a kind with improved brightness, which is recently coming to be available. A well focussed beam of light from the target light according to this invention is characterized as illuminating only a small area on the object to be photographed such as a fish, or an area which is small compared to the field of vision through the finder of the camera. If the illuminated area on the object to be photographed were comparable in area to the field of vision, the user would not be able to ascertain accurately where the flash light is being aimed. For the purpose of the present invention, the target light will be required to be sufficiently strongly converged and hence narrowly focussed such that the illuminated area will be less than ¼ of the field of vision of the finder of the camera (or a liquid crystal display panel, depending on the kind of the camera) although it is preferable and is usually less than ¼ of the field of vision, as illustrated in FIG. 4. Use for this purpose may be made, for example, of a combination of a single lens and an LED formed as a single integrated package. Even an ordinary incandescent light bulb with a focussing means such as a reflecting mirror, like an ordinary hand-held flash light, may serve as a target light.

Figure 1:
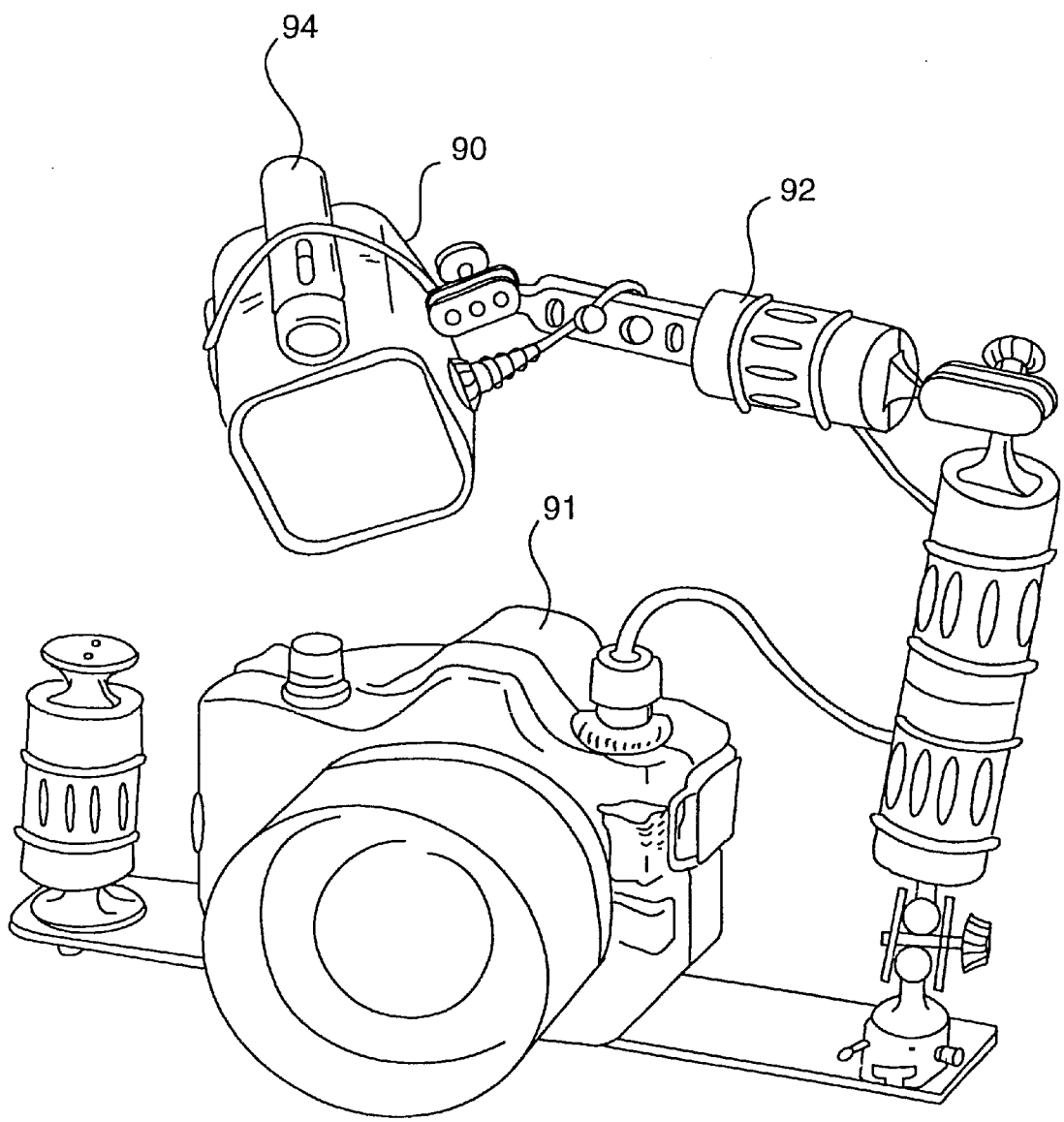
FIG. 1 is a schematic drawing of a prior art system for underwater photography with a penlight attached to a flash lamp which is connected through a flexible arm to a camera inside a waterproof housing.

On the side surface of the flash lamp 80 are a power source switch 83, a mode selection switch 84 and a display device 85. Although not visible in FIG. 3A, the back surface of the flash lamp 80 is provided with an opening for storing dry cell batteries. On the underside, there are an attachment part 86 for connecting to the tip of a flexible arm (as shown in FIG. 1) and a connector 87 for connecting to a signal cable. The connector 87 is normally for connecting to an electrical signal cable 88 for exchanging electrical signals with the camera (as shown at 91 in FIG. 1) but may be formed for connection with an optical signal cable 89, as will be explained below. If the connector 87 is formed for connection with an electrical signal cable, it is important to provide a water-proofing structure such as a sealing rubber piece fastened by screwing a water-proof cap thereon such that there is no invasion of water into the electrically connecting part. If the connector 87 is for connection with an optical signal cable, it is sufficient to provide a mechanism for securely attaching the end of an optical fiber to the surface of the light-receiving element of the flash lamp. Since invasion of water does no damage in this case, no water-proofing structure is necessary. This has the merit wherein that the component can be made smaller and the production cost can be reduced.

Figure 5:
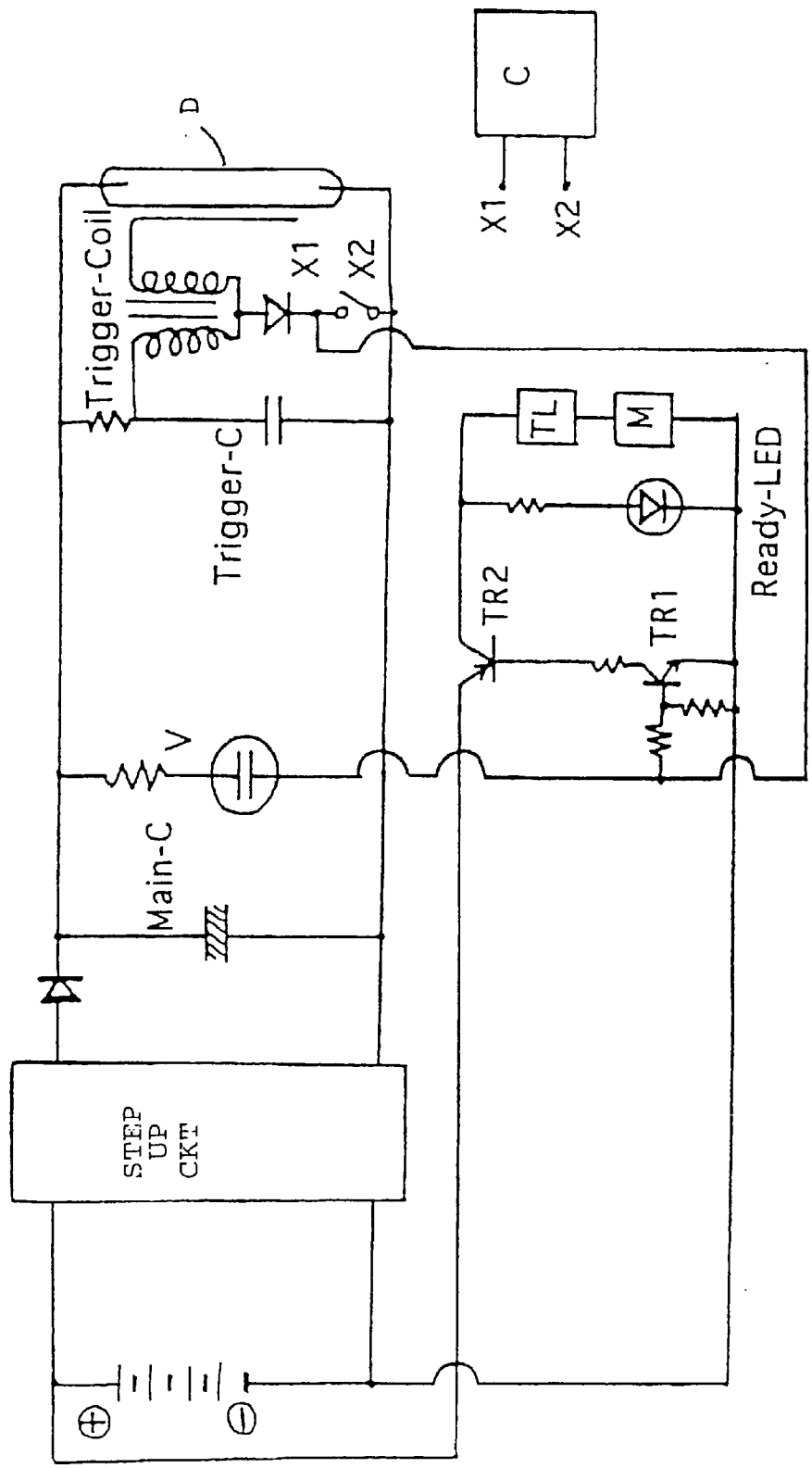
FIG. 5 is a diagram of an example of circuit for the flash lamp embodying this invention.

FIG. 5 is a diagram of an example of circuit for the flash lamp embodying this invention shown in FIG. 3 adapted to switch on the target light (TL) when the flash lamp has been charged up. Since at least a portion of a circuit of this type is well known by persons skilled in the art, the diagram of FIG. 5 will be described only briefly.

The voltage from the batteries serving as the powder source is increased by a step-up converter (Step-up) in order to activate the discharge tube D and the energy from this power source is stored in a main capacitor (Main-C). When the voltage across this main capacitor reaches a specified value (or the lamp has been sufficiently charged), this is detected by a voltage detector V, such as a neon tube, and a laser diode serving as the target light TL is turned on. As transistors TR1 and TR2 are switched on an LED (Ready-LED) on the side surface of the flash lamp for indicating this ready condition is simultaneously turned on. If the shutter button on the camera C is fully compressed thereafter to open the shutter, the camera outputs a close signal through the X-contact. This close signal is communicated to the flash lamp through terminals $X_1$ and $X_2$ through which the flash lamp is connected to the camera, causing a high voltage to be generated by a trigger coil (Trigger-Coil) with the energy stored in a trigger capacitor (Trigger-C) and the discharge tube D to start emitting a strong flash light. As the connection between the terminals $X_1$ and $X_2$ is thus closed, the base and the emitter of transistor TR1 become connected, and this causes the target light TL to be extinguished nearly at the same time.

When the emission of the flash light is completed, a picture having been taken, and the shutter is closed, the close signal from the camera through the X-contact is stopped. Since the connection between terminals $X_1$ and $X_2$ is opened, the target light TL is then turned on again. The monitoring circuit M (shown at 822 in FIG. 4), provided next to the laser diode serving as the target light TL, is for monitoring the light emission from the laser diode, compensating for the change, if there is any in the environmental conditions such as a change in temperature, such that the target light TL can function in a reliably stable manner.

Since flash lamps are usually used in the so-called TTL (through-the-lens) mode (wherein light through the picture-taking lens is used as a signal), flash lamps embodying this invention are also provided with a circuit for photography in this mode but the circuit for the TTL mode is not shown in FIG. 5 or in the subsequently figures for simplifying the disclosure.

It is to be reminded that FIG. 5, as well as the figures that follow, are for showing the principles of the operations. The invention does not require that the terminals $X_1$ and $X_2$ be directly connected to the X-contact of the camera C. The opening and closing of the connection between terminals $X_1$ and $X_2$ (symbolically shown as a switch therebetween) may be effected, for example, through an optical signal emitted as the shutter is opened.

Figure 6:
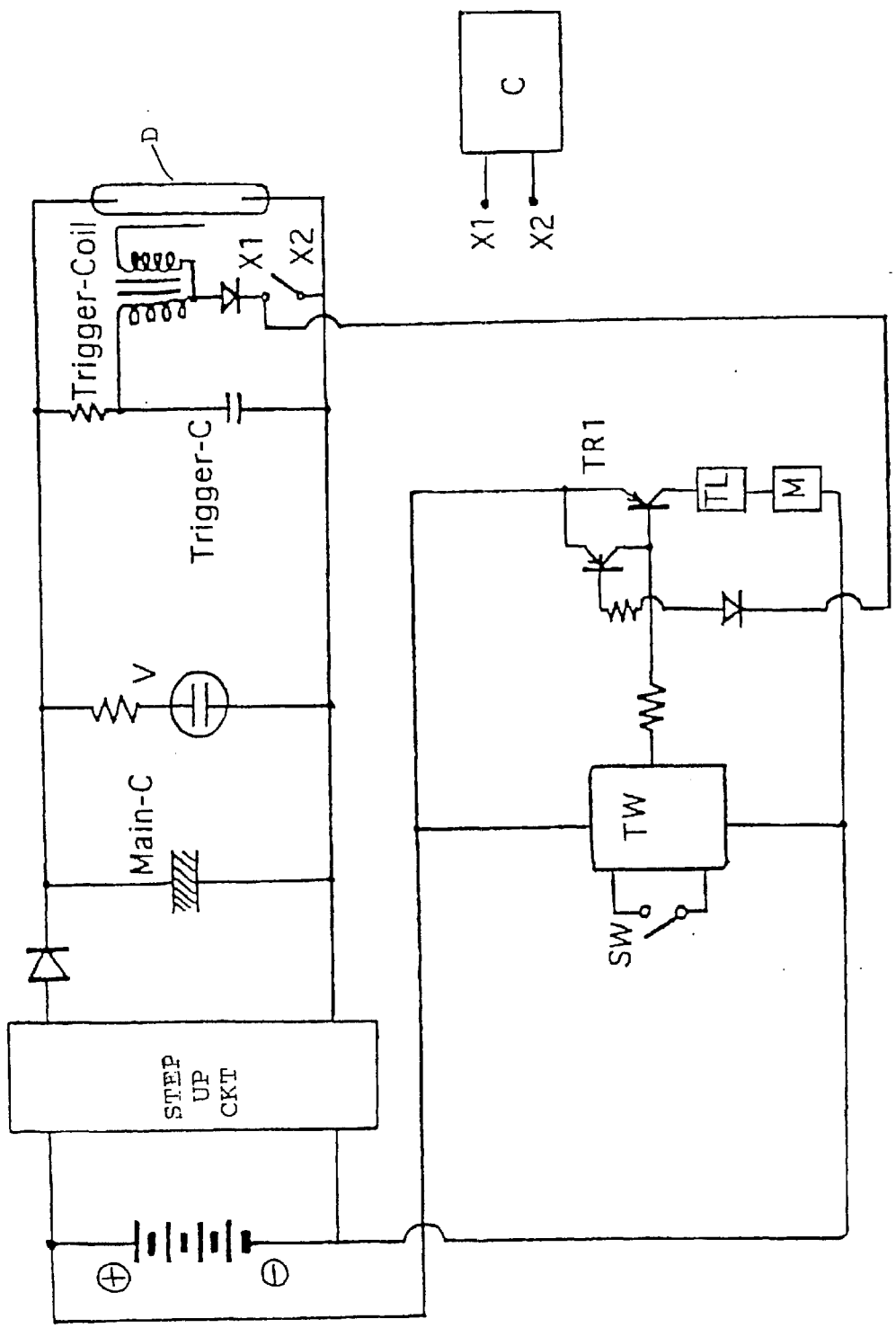
FIGS. 6–8 are diagrams of other examples of circuit for the flash lamp embodying this invention.

FIG. 6 is a diagram of another example of circuit for the flash lamp embodying this invention adapted to switch on the laser diode serving as target light TL in coordination with a timer TW incorporated in the flash lamp. With a circuit thus structured, the target light TL is turned on by the timer TW within the flash lamp, independent of whether the charging has been completed or not. The timer TW may be adapted to be switched on by pressing a reset switch or a gate switch (SW in FIG. 6) provided on the side surface of the flash lamp and to keep the target light TL switched on for a period of several seconds to nearly a minute. If the shutter button is fully compressed thereafter to open the shutter, the camera C outputs a close signal through the X-contact. This close signal is communicated to the flash lamp through terminals $X_1$ and $X_2$ and its discharge tube D begins to emit a strong flash light, as explained above with reference to FIG. 5. As the connection between the terminals $X_1$ and $X_2$ is closed, the connection between the base and the emitter of transistor TR1 is closed, and this causes the target light TL to be extinguished nearly at the same time. When the emission of the flash light is completed, a picture having been taken, and the shutter is closed, the close signal from the camera C through the X-contact is stopped. Since the connection between terminals $X_1$ and $X_2$ is opened, the target light TL is then switched on again and remains switched on as long as the timer TW is switched on.

Figure 7:
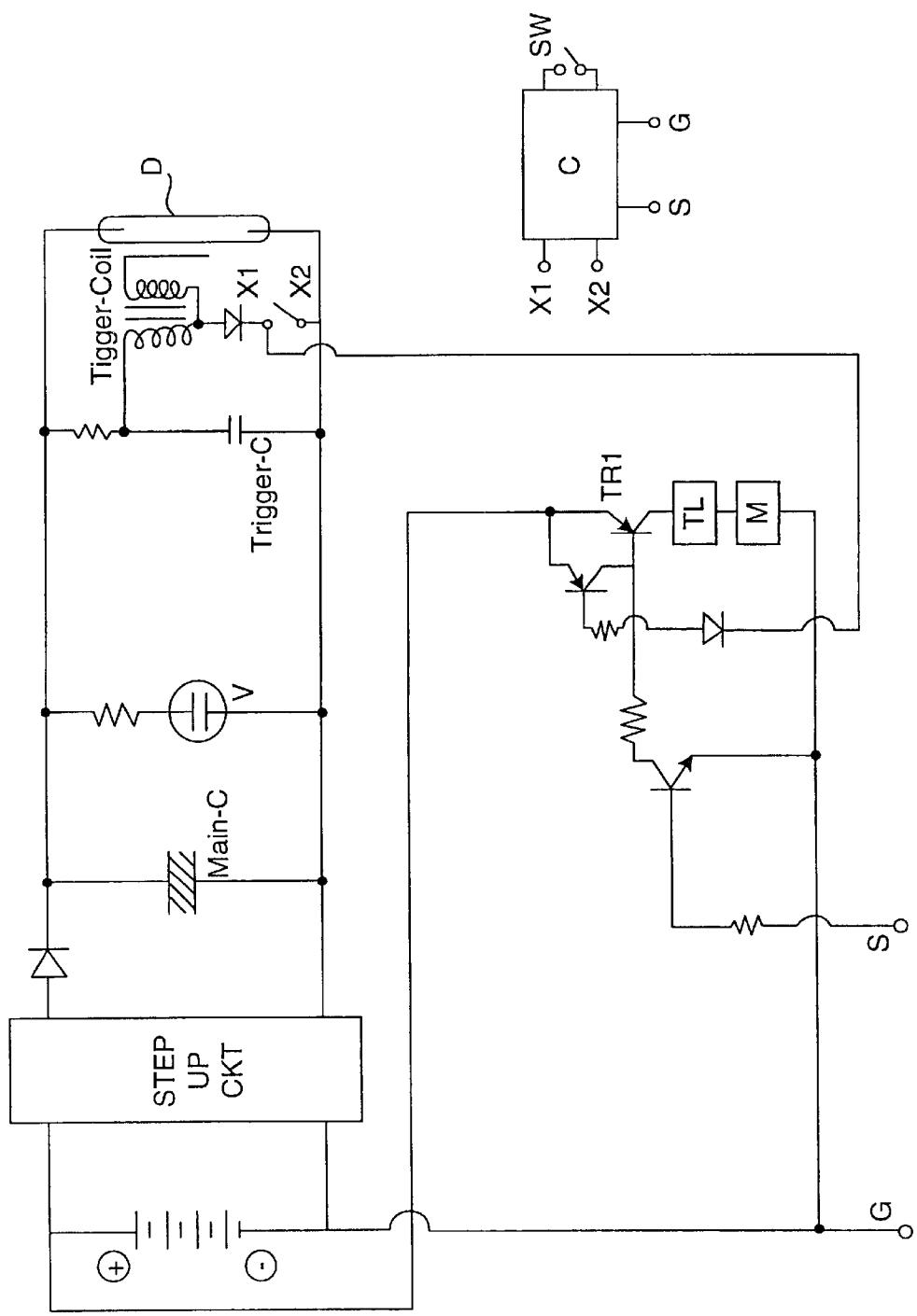

FIG. 7 is a diagram of still another example of circuit for the flash lamp embodying this invention adapted to switch on the laser diode serving as target light in coordination with a timer (not separately shown) incorporated in the camera C. With a circuit thus structured, the target light TL is turned on by the timer incorporated in the camera C, independent of whether the charging has been completed or not. The timer may be adapted to be switched on by pressing a reset switch or a gate switch provided on the side surface of the flash lamp and to keep the target light TL switched on for a period of several seconds to nearly a minute. If the shutter button is fully compressed thereafter and the shutter is thereby opened, the camera outputs a close signal through the X-contact. This close signal is communicated to the flash lamp through terminals $X_1$ and $X_2$ and its discharge tube D begins to emit a strong flash light. As the connection between the terminals $X_1$ and $X_2$ is closed, the base and the emitter of transistor TR1 are shorted, and this causes the target light TL to be extinguished nearly at the same time. When the emission of the flash light is completed, a picture having been taken, and the shutter is closed, the close signal from the camera C through the X-contact is stopped. Since the connection between terminals $X_1$ and $X_2$ is opened, the target light TL is then turned on again and remains turned on as long as the timer is switched on and its signal is received through terminals S and G. It is again to be reminded that FIG. 7, too, is intended to show the principles of the operations and that the connection through terminals S and G is not required to be direct. A signal conversion circuit may be required through this connection, depending on the circumstances.

Figure 8:
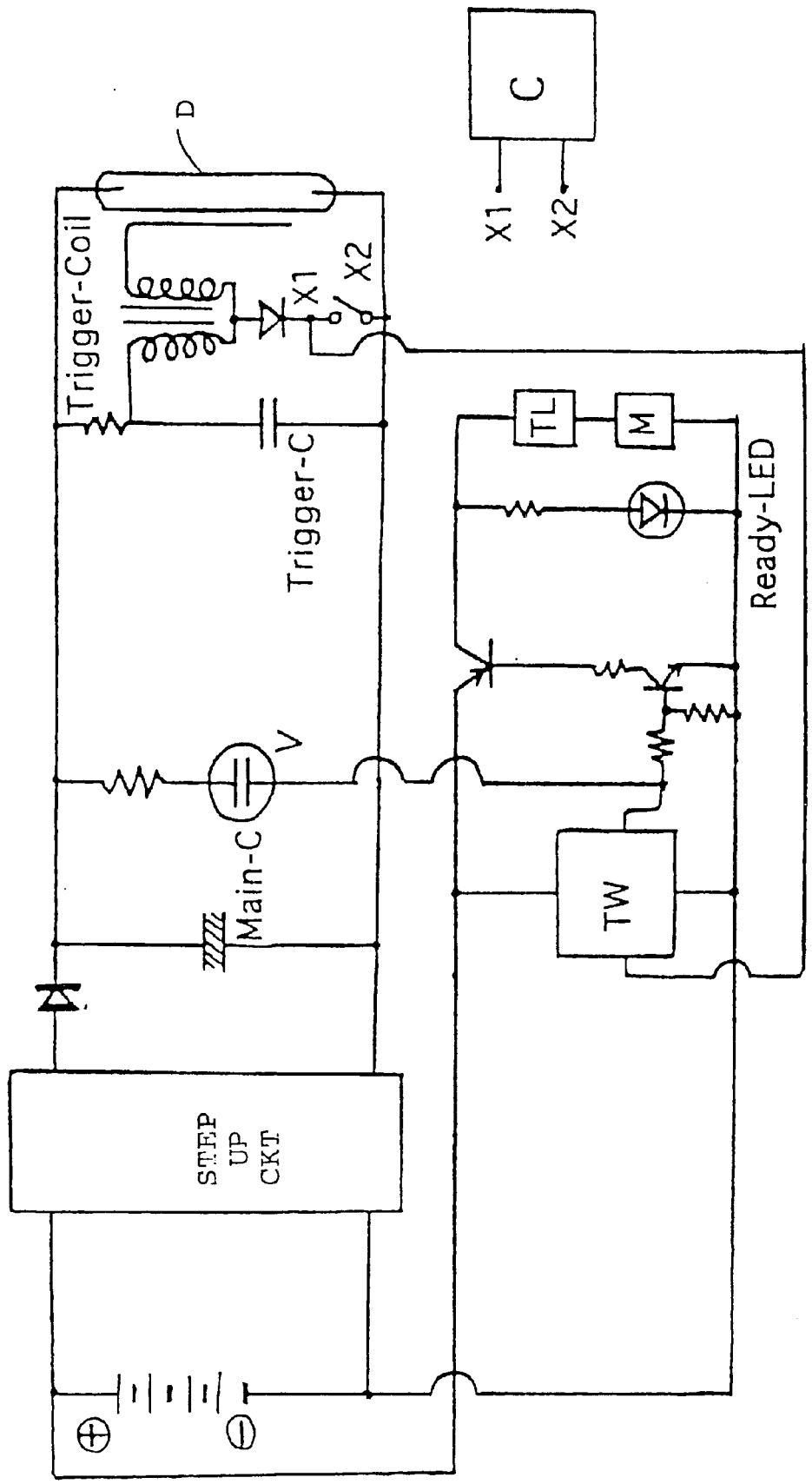

FIG. 8 is a diagram of still another example of circuit for the flash lamp embodying this invention adapted to switch on the laser diode serving as target light TL in coordination with the completion of charging and a timer TW. This circuit is similar to the one shown in FIG. 5 in that the target light TL is turned on basically when the charging is completed but the timer TW is adapted to somewhat increase the off-time of the target light TL (or the time during which the target light TL remains turned off) in order to make it easier for the user to visually ascertain the extinction of the target light TL while a picture is being taken.

When the actual exposure time is 1/60 second, or when the close signal is outputted through the X-contact and the shutter remains open for a period of 1/60 second, for example, the off-time of the target light will also be about 1/60 second if the circuit is as shown in FIG. 5. The circuit shown in FIG. 8 includes the timer TW (which may be a one-shot multi-circuit) which serves to delay the time to turn on the target light TL again such that the off-time of the target light TL is increased to ½ second. The timer TW may be set to make this off-time even longer. This has the merit of enabling the user to visually ascertain the extinction of the target light TL as well as the functioning of the underwater camera system.

In summary, since the timing for turning off the target light TL as well as its off-time can basically be adjusted as long as the entry of light through the lens can be prevented, there is no problem even if the time to start turning off the target light TL becomes later than the time to open the shutter of the camera by a few milliseconds due, for example, to the convenience of circuit design.

Figure 9:
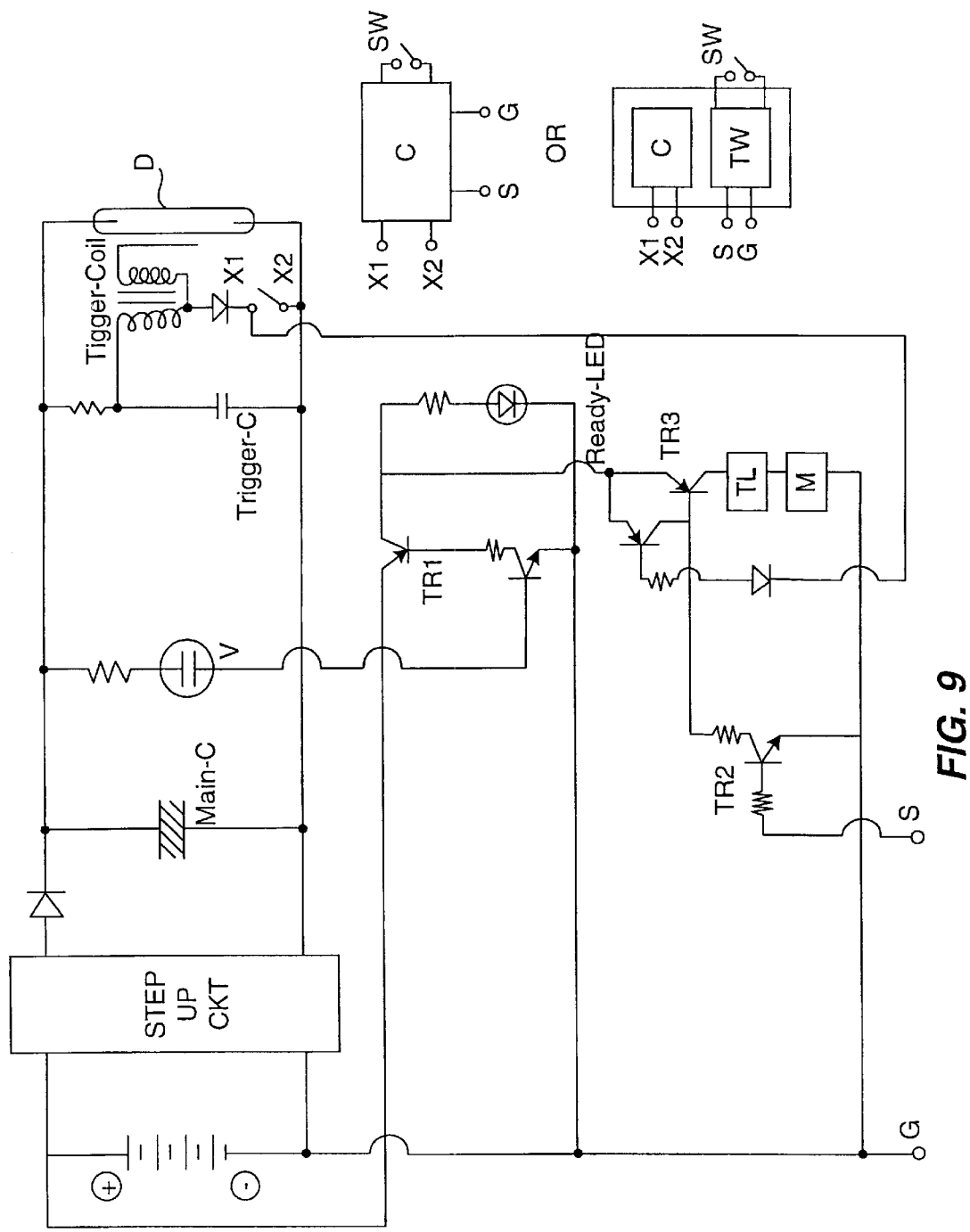
FIG. 9 is a diagram of still another example of circuit for the flash lamp embodying this invention operable in an energy saving mode.

FIG. 9 is a diagram of still another example of circuit for the flash lamp embodying this invention, characterized also as being operable in an energy-saving mode. After a voltage detector V such as a neon tube detects that the charging has been completed, both the Ready-LED on the side surface of the flash lamp and the laser diode serving as the target light TL remain turned on while a ready signal indicating that the shutter button on the camera is in a half compressed condition (or a timer signal from the camera C or a unit inside the flash lamp) is being inputted at terminal S. When the shutter button is thereafter pushed in completely and the shutter is opened, a close signal is outputted from the camera through the X-contact and transmitted between terminals $X_1$ and $X_2$ of the flash lamp, causing a strong flash light to be emitted. As the connection between terminals $X_1$ and $X_2$ is closed, the base and the emitter of transistor TR3 are shorted and the target light TL is turned off approximately simultaneously with the emission of the flash light. When the emission of the flash light is completed, a picture having been taken, and the shutter is closed, the close signal from the camera through the X-contact is stopped and the connection between terminals $X_1$ and $X_2$ is opened. As a result, the target light TL is turned on again.

It is to be reminded that FIG. 9 symbolically shows two embodiments, one with the timer incorporated in the camera C and the other with the timer TW attached to the camera C but within the same housing. The example described above with reference to FIG. 9 may be regarded as a combination of two embodiments shown with reference to FIGS. 5 and 7.

Figure 10:
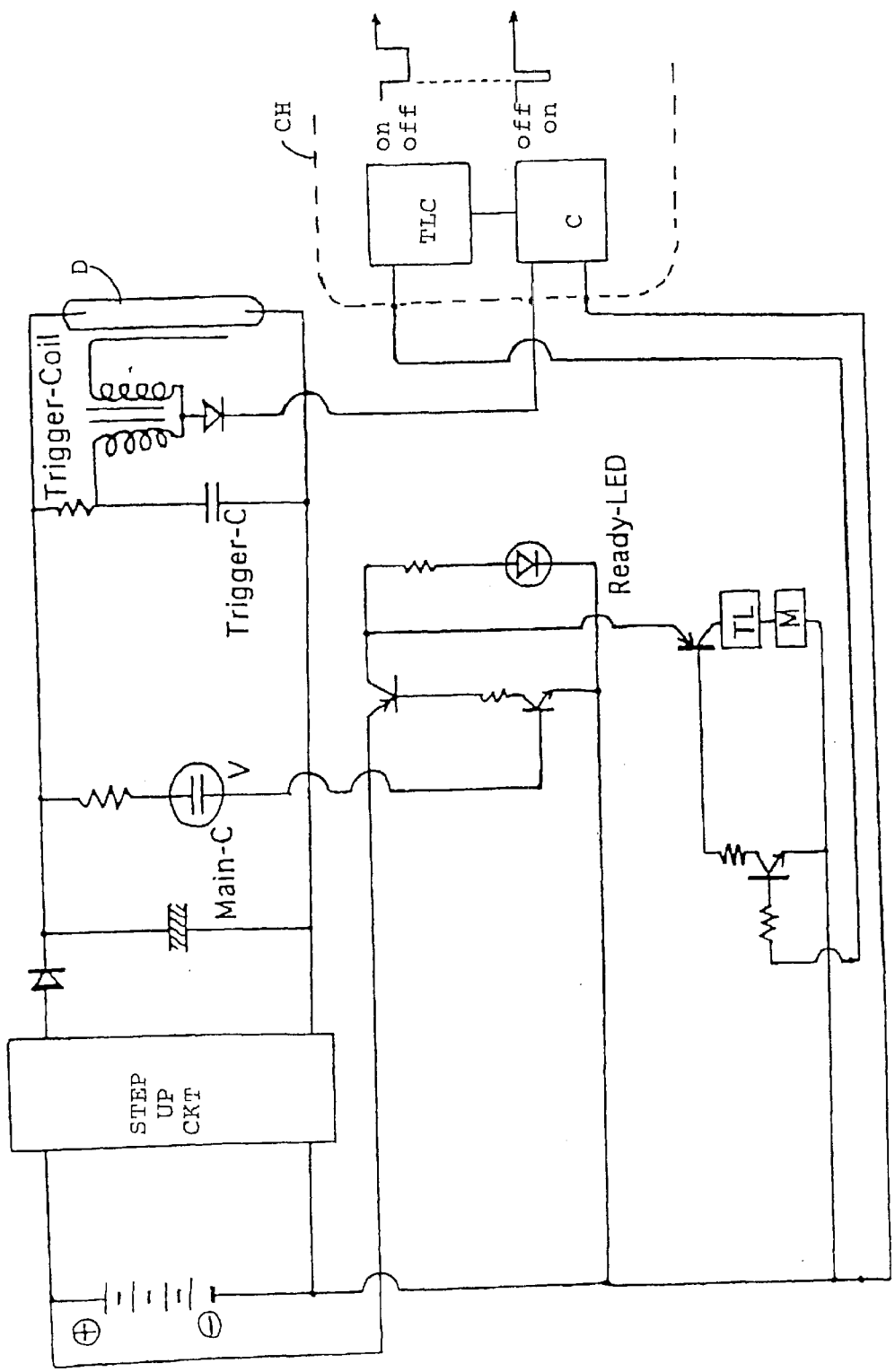
FIG. 10 is a diagram of still another example of circuit for the flash lamp embodying this invention operable in an energy saving mode in coordination with the operation of a waterproof camera housing.

FIG. 10 is a diagram of still another example of circuit for the flash lamp embodying this invention, characterized also as being operable in an energy-saving mode in coordination with the operation of the waterproof camera housing. Since FIG. 10 is primarily intended to show the connection and coordination between a flash lamp and a waterproof camera housing CH, the circuit for controlling the quantity of light from the discharge tube D is omitted for the convenience of disclosure. The embodiment shown in FIG. 10 is different from that in FIG. 9 in that a portion of the control circuit is inside the camera housing CH. A target light control circuit TLC is contained inside the waterproof camera housing CH (shown on the right-hand end of FIG. 10) and responds, when the shutter of the camera is opened and this signal is received from the X-contact of the camera C, by outputting a light-off signal for causing the target light TL to be turned off and transmitting it to the flash lamp. As this light-off signal is received by the flash lamp (shown on the left-hand side of the camera housing in FIG. 10), emission from the target light TL is stopped The function of the target light control circuit TLC is to output a control signal for the control of the target light TL by combining action system signal from the camera C, open and close signals received through the X-contact and a timer signal. Since the timing for turning off the target light as well as its off-time can be varied as long as the entry of external light through the lens into the camera can be prevented, there is no problem even if the time to start turning off the target light TL becomes later than the time to open the shutter of the camera by a few milliseconds due, for example, to the operating routine of the control circuit.

There are situations wherein the off-time of the target light TL may be shorter than the exposure time during which the shutter of the camera remains open. Even if the exposure time is 10 milliseconds and the off-time of the target light TL is 8 milliseconds, for example, there is no problem of light entering through the lens as long as their timing is approximately matched.

It has already been stated above that the timing for turning off the target light as well as its off-time can be adjusted appropriately within the limit that the entry of light through the lens can be prevented. If the camera in the housing is a single-lens reflex camera produced by Canon Corporation, for example, the action control signal from the camera is switched off temporarily about 20 milliseconds before a start signal for starting emission of light is outputted through the X-contact, and the target light control circuit TLC may be structured so as to switch off the target light TL on this basis such that the target light TL can be switched off instantaneously before the flash light is emitted.

Figure 11:
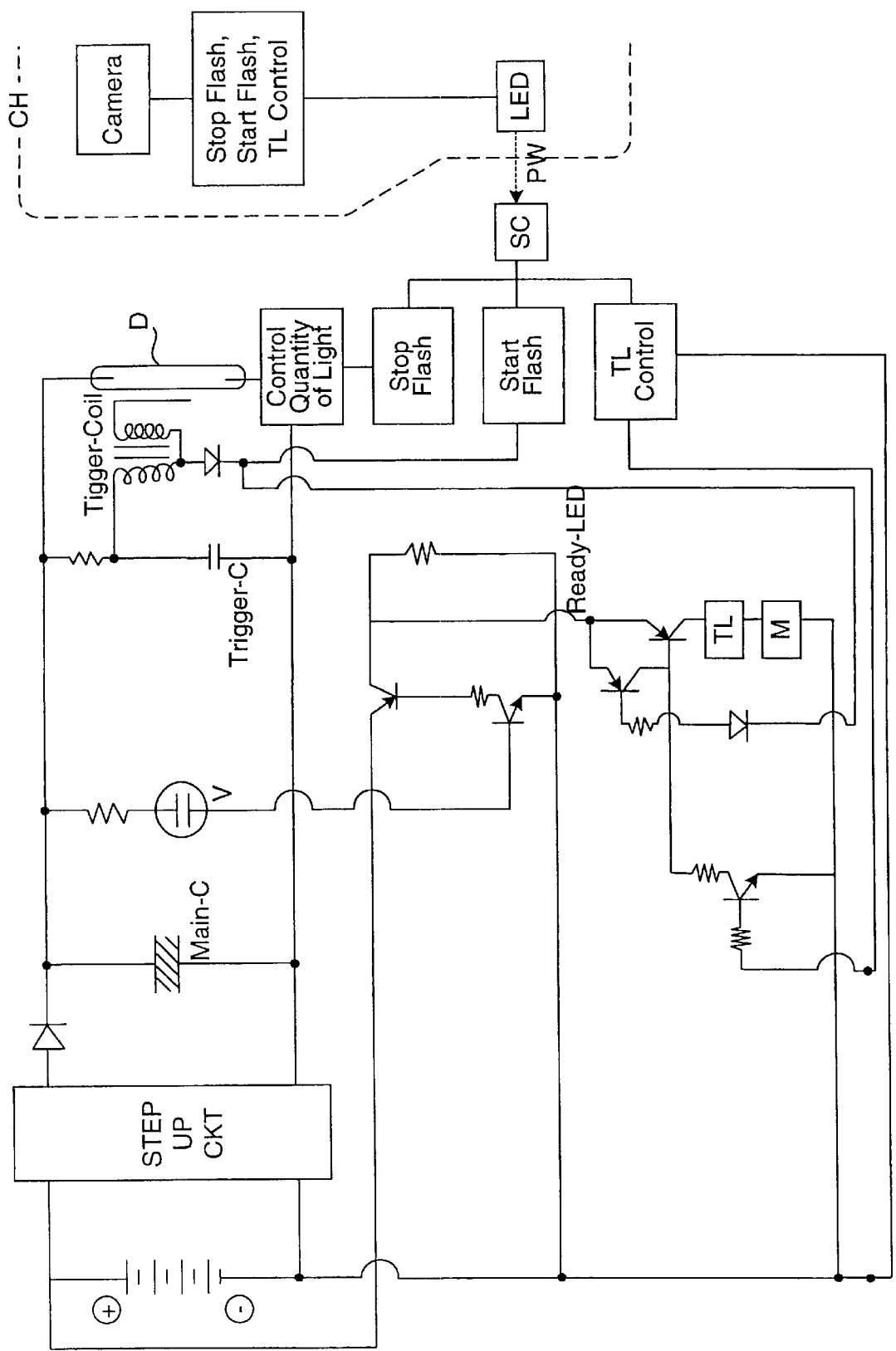
FIG. 11 is a diagram of still another example of circuit for the flash lamp embodying this invention connectable to an optical fiber signal cable.

FIG. 11 shows still another example of circuit for a flash lamp embodying this invention connectable to an optical fiber signal cable PW as shown at 89 in FIG. 3. FIG. 11 shows, in addition to a circuit diagram as shown in FIG. 9, a block diagram of a waterproof camera housing CH to which the flash lamp is connected, as well as some additional circuits provided to the flash lamp. This camera housing CH is provided with a light-emitting diode LED with its light-emitting surface externally exposed, serving to convert electrical signals (including signals for controlling the target light TL, for starting the flash light emission and for stopping the flash light emission) which have been internally processed into an optical signal and to transmit it through the optical signal cable PW. The flash lamp has a light-receiving sensor in its connector SC (shown at 87 in FIG. 3) which serves to receive the optical signals from the light-emitting diode LED in the camera housing CH and to convert them back into electrical signals to be sent to a circuit for generating signals for controlling the target light TL, another circuit for generating a signal to be sent to the trigger coil (Trigger-Coil) for starting the flash light and still another circuit for generating a signal to be transmitted to circuit for controlling the quantity of emitted flash light for stopping the emission of flash light from the discharge tube D.

Although this circuit structure is for having a target light control signal transmitted from the camera (or the target light control circuit TLC inside its waterproof housing CH) for controlling the operation of the target light TL, it may be designed such that the start signal for initiating the emission of flash light is also transmitted through the X-contact of the camera, thereby switching off the control circuit for the target light TL and the target light TL can be turned off more dependably.

Advantages of using an optical fiber signal cable have already been described above. It now goes without saying, although separate circuit diagrams are not shown, the others of the circuits shown in FIGS. 5–10 can also be modified so as to be controllable by signals transmitted optically from the camera C.

Although the invention has been described more or less in general terms above, it also goes without saying that many modifications and variations are possible in order to obtain improved results. Since laser diodes emitting light with different colors such as red, light green and orange are available, it is desirable to choose a laser diode emitting light of a color easily recognizable by the user on the object to be photographed even through a goggle. As an alternative, although not separately illustrated, the target light may comprise a light-emitting diode, instead of a laser diode, provided with a converging lens or formed as a package, say, with an epoxy covering the diode in the shape of a converging lens for strongly converging the emitted light. Light from such a target light using an LED cannot reach the distance reachable by light from a laser diode but the use of such a target light using a light-emitting diode is advantageous in that light with more different colors can be provided. When a plurality of flash lamps are used simultaneously in underwater photography, for example, it is convenient to color-code the flash lamps, or to design the flash lamps such that each of the flash lamps emit light of a different color such that the user can ascertain the conditions of these flash lamps instinctively and more dependably. This is schematically illustrated in FIG. 4 by showing light beams of different colors by broad and thin dotted lines. As explained above, furthermore, the invention does not exclude ordinary incandescent light bulbs from being used as the target light.

Flash lamps embodying this invention have been described above as a whole. Specific examples of method and devices for controlling such flash lamps with a target light, which may even comprise an ordinary light bulb instead of a diode laser or a focussed LED, will be described more in detail in what follows.

Figure 2:
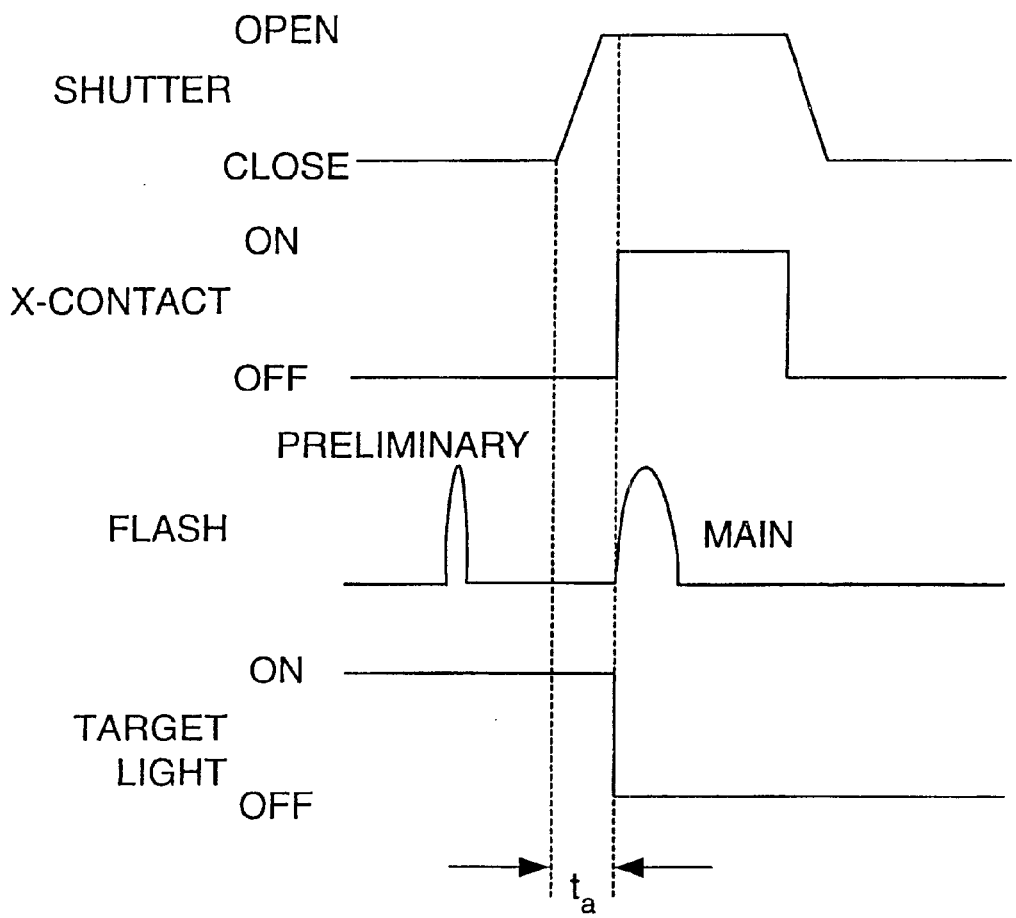
FIG. 2 is a timing chart for an example of prior art control method of a target light for a digital camera used for underwater photography.

One of the control methods to be described in detail next is for controlling the light emission from a target light for underwater photography, say, by using a digital camera contained inside a waterproof housing as described above, and a flash lamp adapted to emit flash light twice when the shutter button is pressed on the camera to take a picture, the first light emission by the flash lamp (to be completed before the camera shutter begins to open) being referred to as the preliminary light emission (abbreviated into PLE in the figures) and the second light emission by the flash lamp being referred to as the main light emission (abbreviated into MLE in the figures). As shown in FIG. 12 as an example, this method is characterized wherein the target light is switched off by using the preliminary light emission of the flash lamp such that the target light is out and the preliminary light emission is completed by the time the shutter begins to open. This is in contrast to the timing chart of FIG. 2 showing a prior art control method, and there is no danger of allowing external light from entering the interior of the camera through its lens.

As a practical matter, it is not strictly necessary that the target light should be switched off totally, or that its light emission should be zero lux and the current therethrough should be zero ampere. It is usually sufficient if the target light is made dark enough so as not to adversely affect the quality of the picture when finally printed. Thus, the target light may be controlled so as to merely make it dark without making it totally dark, by using the preliminary light emission of the flash lamp as the trigger, say, by reducing the current flowing through. If the target light source is an ordinary incandescent light bulb, for example, the current therethrough will tend to rise sharply when it is switched on after it is earlier switched off. The frequent switching on and off of a lamp causes its power consumption to increase. Thus, the control method of merely making the target light darker instead of switching it off has the merit of reducing the power consumption. The degree to which the target light is made darker will depend on factors such as ISO sensitivity, the brightness of the lens and the shutter speed (or the exposure time).

Next, let us consider ways of underwater photography, say, with a digital camera contained in a waterproof housing with an internally provided flash lamp and an externally provided flash lamp. A flash lamp incorporated into the digital camera or a flash lamp which is not incorporated into the digital camera but is externally attached to the camera and is contained together in the same waterproof housing with the camera will be hereinafter referred to as the internally provided flash lamp. A flash lamp which is used outside of the housing will be hereinafter referred to as the externally provided flash lamp. The following three modes of operating the flash lamps will be considered:

(1) The mode wherein the internally provided flash lamp emits light twice (preliminary light emission and main light emission) and the externally provided flash lamp emits light also twice in synchronism with the light emission from the internally provided flash lamp;

(2) The mode wherein the internally provided flash lamp emits light twice (preliminary light emission and main light emission) but the externally provided flash lamp emits light only once in synchronism with the main light emission from the internally provided flash lamp; and (3) The mode wherein only the internally provided flash lamp emits light twice.

In all of these modes of operation, the target light may be switched off or made dark by using the preliminary light emission of the internally provided flash lamp as the trigger. Although it is usually the case nowadays to use an externally provided flash lamp in underwater photography, improved waterproof housings are becoming available and underwater photography can be carried out by using only an internally provided flash lamp. The third of the modes above relates to such situations.

There are flash lamps not adapted to carry out the preliminary light emission but to carry out only the main light emission. The present invention is addressed also to the control of a flash lamp of this type as shown in FIG. 13. In general, a digital camera is provided with an LED for indicating a ready condition, or for indicating to the user that the shutter button is ready to be pressed, for example, when the lens has been focussed in the case of an auto-focussing type of camera. Such an LED is usually provided near the finder of the camera or near its liquid crystal display device and is adapted to light up when the user presses the shutter button to the half-way position. Since this is done naturally before the shutter button is completely pressed to open the shutter, it can be used conveniently as the trigger for switching off the target light or making it darker. In summary, the control method according to this invention can be used whether the flash lamp is adapted to emit light twice (preliminary and main) or only once (the main only), dependably preventing the light from entering through the camera lens.

In either mode (1) or (2) described above, the switched-off or darkened condition of the target light can be maintained at least until the shutter is completely closed, as shown in FIGS. 12 and 13, for example, by means of a timer.

As shown by a broken line in FIG. 13, the indicator LED of some digital cameras is adapted to be switched off before the shutter begins to open. In such a case, it is desirable to use the switching off of this LED as the trigger for activating the timer and to keep the target light turned off or in the darkened condition until the shutter is completely closed.

For using the preliminary light emission by the flash lamp or an LED as a trigger, a light detecting circuit may be used to detect the light serving as the trigger and the target light is controlled in response to a detection signal outputted from such a light detecting circuit.

The invention is not limited by the position of the target light to be controlled, whether it is attached to an externally provided flash lamp or inside the waterproof camera housing. If it is attached to an externally provided flash lamp, the target light may be provided on the waterproof container for the flash lamp or a separate waterproof container may be provided either in an integrated form or in a detachably attachable form. If the target light is provided to the waterproof housing, it may be incorporated in the waterproof housing or a waterproof container of the target light may be attached to the waterproof housing integrally or in a detachably attachable form.

The control methods described above may be effected by means of a control device of a kind comprising a preliminary emission detecting device for detecting the preliminary light emission of the flash lamp and a target light control circuit for switching off or darkening the target light in response to a detection signal from the preliminary emission detecting device, or a control device of another kind comprising an LED light detecting circuit for detecting the emission of light from an LED serving to emit light for indicating a ready condition such that the shutter button of the camera has been pressed to a half-way position and a target light control means for switching off or darkening the target light in response to a detection signal from the LED light detecting circuit. Control devices of these kinds will be described more in detail with reference to the circuit diagrams of FIGS. 14–17.

Figure 14:
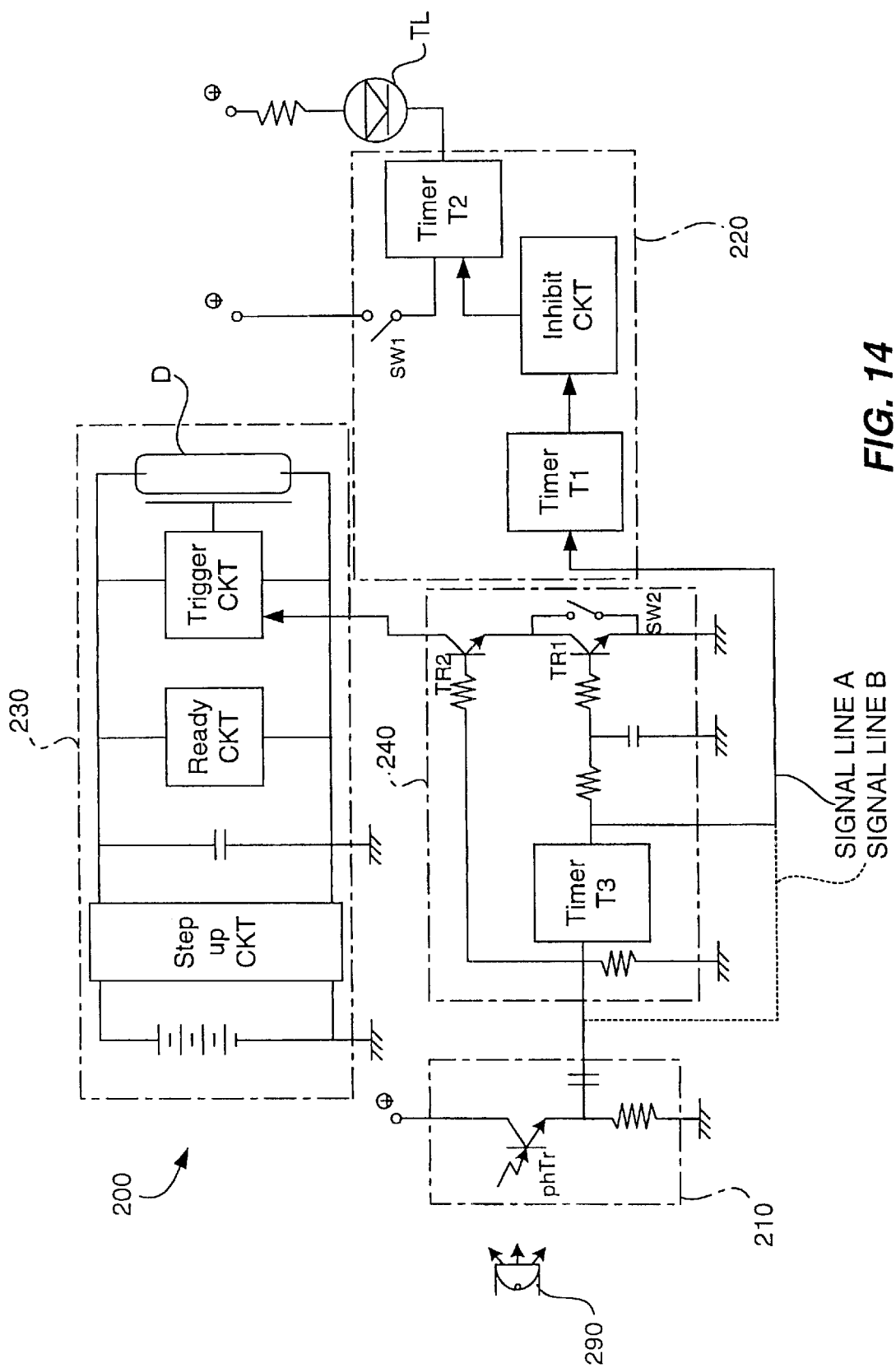
FIG. 14 is a diagram of a control circuit embodying this invention for a target light.

FIG. 14 shows a control circuit 200 comprising a flash detecting circuit 210 having a phototransistor PhTr serving as the preliminary emission detecting device and a target light control circuit 220 having a timer T1. When the preliminary light emission from an internally provided flash lamp 290 is detected by the phototransistor PhTr of the flash detecting circuit 210, its detection signal is transmitted through signal line A or B to switch on the timer T1 in the target light control circuit 220 and to thereby switch off the target light TL. Numeral 230 indicates an externally provided flash lamp with circuitry similar to those shown in FIGS. 5–10 and drawn in a simpler form, and numeral 240 indicates a circuit for its control.

Figure 18A:
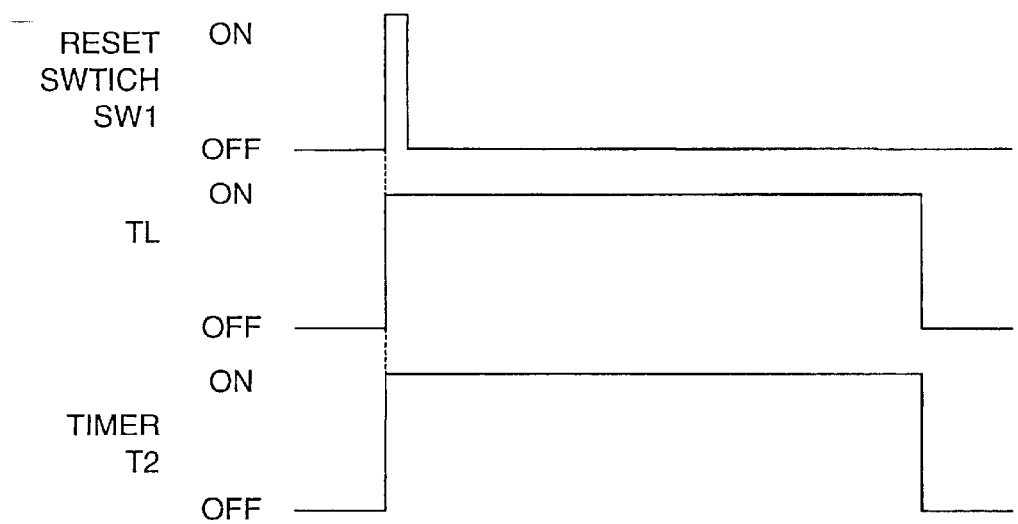
FIGS. 18A and 18B are timing charts for the control of target light according to this invention.
Figure 18B:
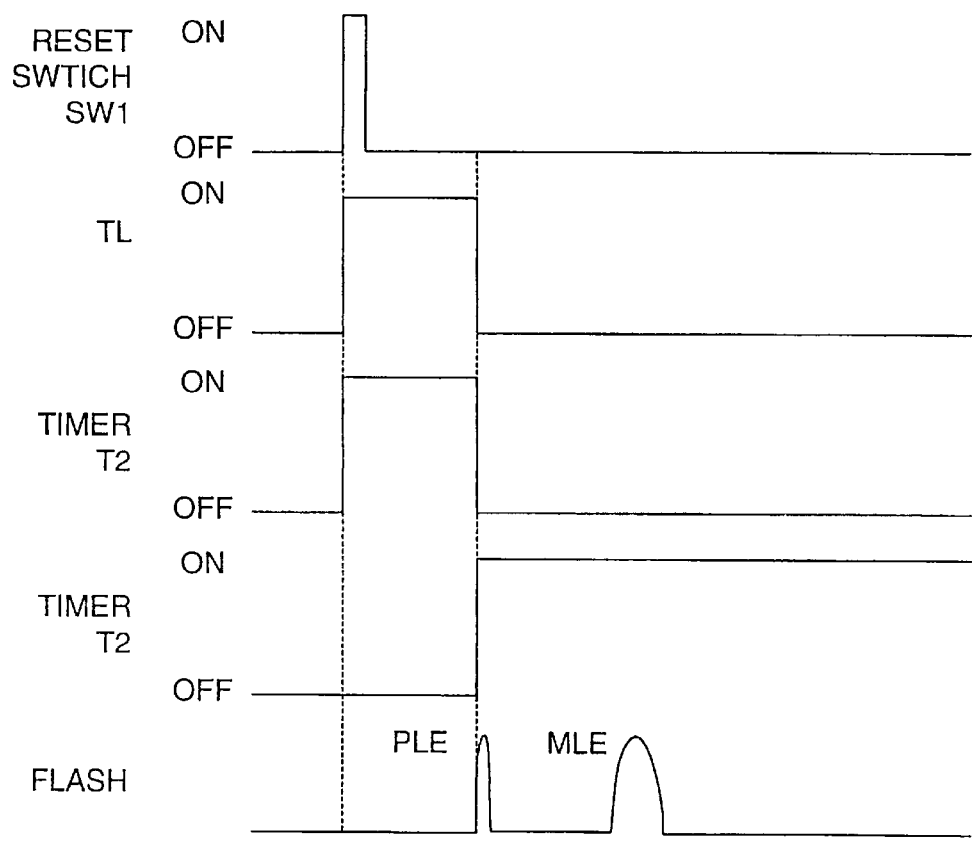

The target light control circuit 220 also includes an inhibitor circuit of a known kind for inhibiting the operation of a connected circuit, another timer T2 and a reset switch SW1. As shown in FIGS. 18A and 18B as an example, the target light TL is initially lit with the reset switch SW1 switching on timer T2. Before there is any preliminary light emission from the flash lamp and while the target light is lit, the operation described above does not take place and, as shown in FIG. 18A, the target light TL remains lit. Timer 2 is for counting the time during which the target light TL is allowed to remain in this lit condition. After a set time has elapsed, the target light TL is automatically turned off.

If the preliminary light emission of the flash lamp takes place while the target light TL is lit, as shown in FIG. 18B, the detection signal from the phototransistor PhTr switches on timer T1, and timer T2 is caused through the inhibitor circuit to be switched off. As a result, the target light TL is switched off. The target light TL is then kept in this switched-off condition by means of timer T1 at least until the camera shutter is completely closed. This is how the circuit 200 of FIG. 14 controls the target light TL to be switched off by using the preliminary light emission from the internally provided flash lamp 290.

If the transmission of the detection signal from the phototransistor PhTr to timer T1 is through signal line B of FIG. 14, this means that both the preliminary light emission and the main light transmission are received by the phototransistor PhTr and that two detection signals are received by timer T1. In this case, the action time of timer T1 may be set equal to the time interval from the moment of the preliminary light emission to that of the main light transmission. When the second signal (by the main light emission) is received, it is reset and then begins to count time. By this routine, too, the target light TL can be maintained switched off after the main light emission and at least until the shutter is completely closed.

The circuit shown in FIG. 14 may be used in modes (1) and (2) described above by means of a bypassing switch SW2 for bypassing transistor TR1 of the control circuit 240 for the externally provided flash lamp 230. When the bypassing switch SW2 is off, timer T3 and transistor TR2 of control circuit 240 are switched on, but transistor TR1 is switched on somewhat later than the preliminary light emission by means of a capacitor. Thus, it is only when the main light emission takes place that both transistors TR1 and TR2 are switched on after the preliminary light emission. A signal is then transmitted from the control circuit 240 to the trigger circuit (shown more in detail in FIGS. 5–10) for the externally provided flash lamp 230 in synchronism with the main light emission of the internally provided flash lamp 290. As a result, the externally provided flash lamp 230 emits flash light from its discharge tube D. In other words, the externally provided flash lamp 230 executes only the main light emission. If the bypass switch SW2 is switched on, on the other hand, the externally provided flash lamp 230 emits flash light twice in synchronism with the preliminary and main light transmission of the internally provided flash lamp 290 because transistor TR1 is bypassed.

Figure 15:
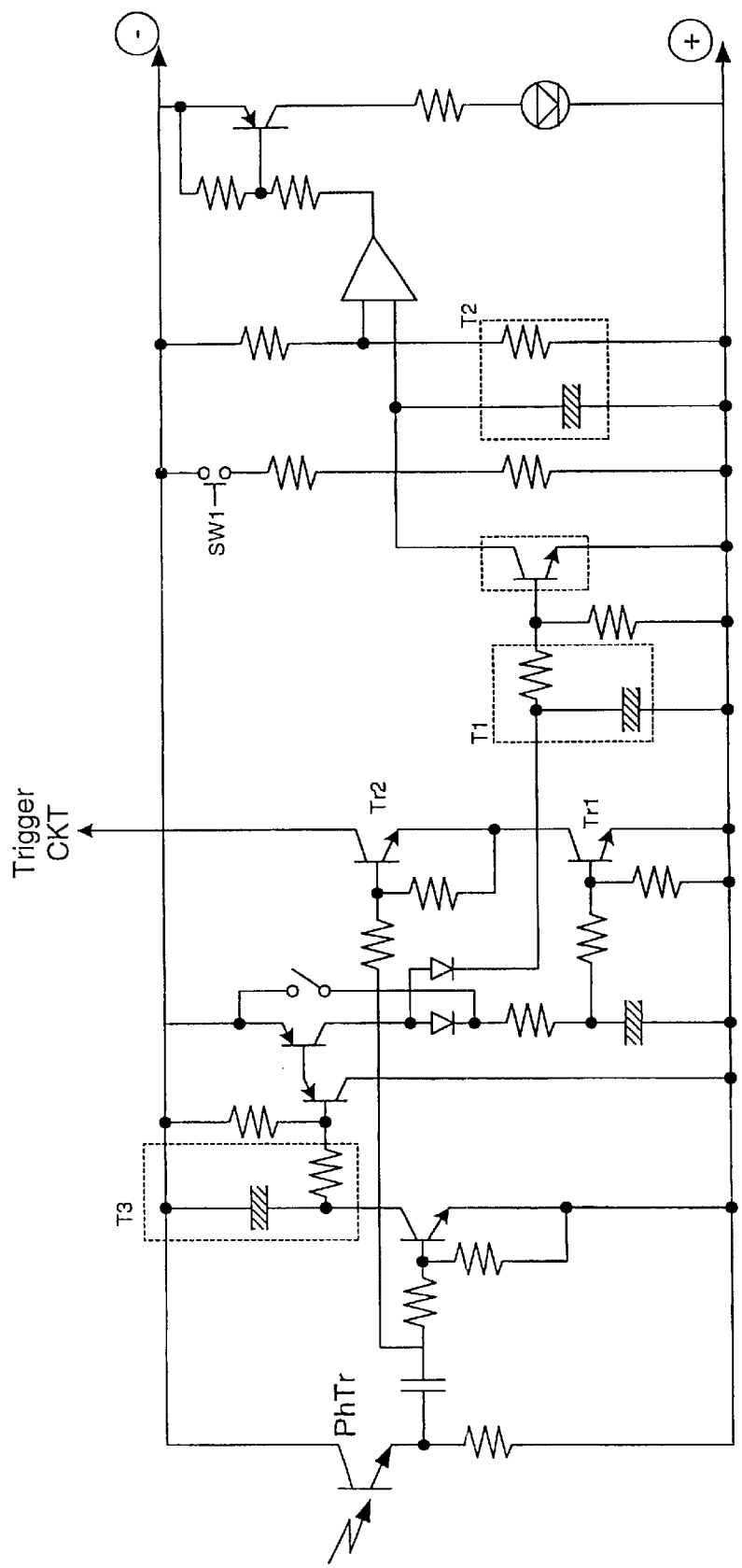
FIG. 15 is a more detailed diagram of the control circuit of FIG. 14.

The control circuit 200 shown in FIG. 14 may be formed as shown in FIG. 15 in more detail. Since it is believed that persons skilled in the art will be able to understand the structure shown in FIG. 15 in view of FIG. 14, detailed explanations of FIG. 15 will be omitted.

Although timers T1 and T2 in the target light control circuit 220 and timer T3 in the control circuit 240 may be formed as shown in FIG. 15 with a capacitor, a logic circuit such as a one-shot multi-circuit may by used for each. These timers T1, T2 and T3 may also be replaced by any of various kinds of means capable of their required functions such as a latch circuit.

Figure 16:
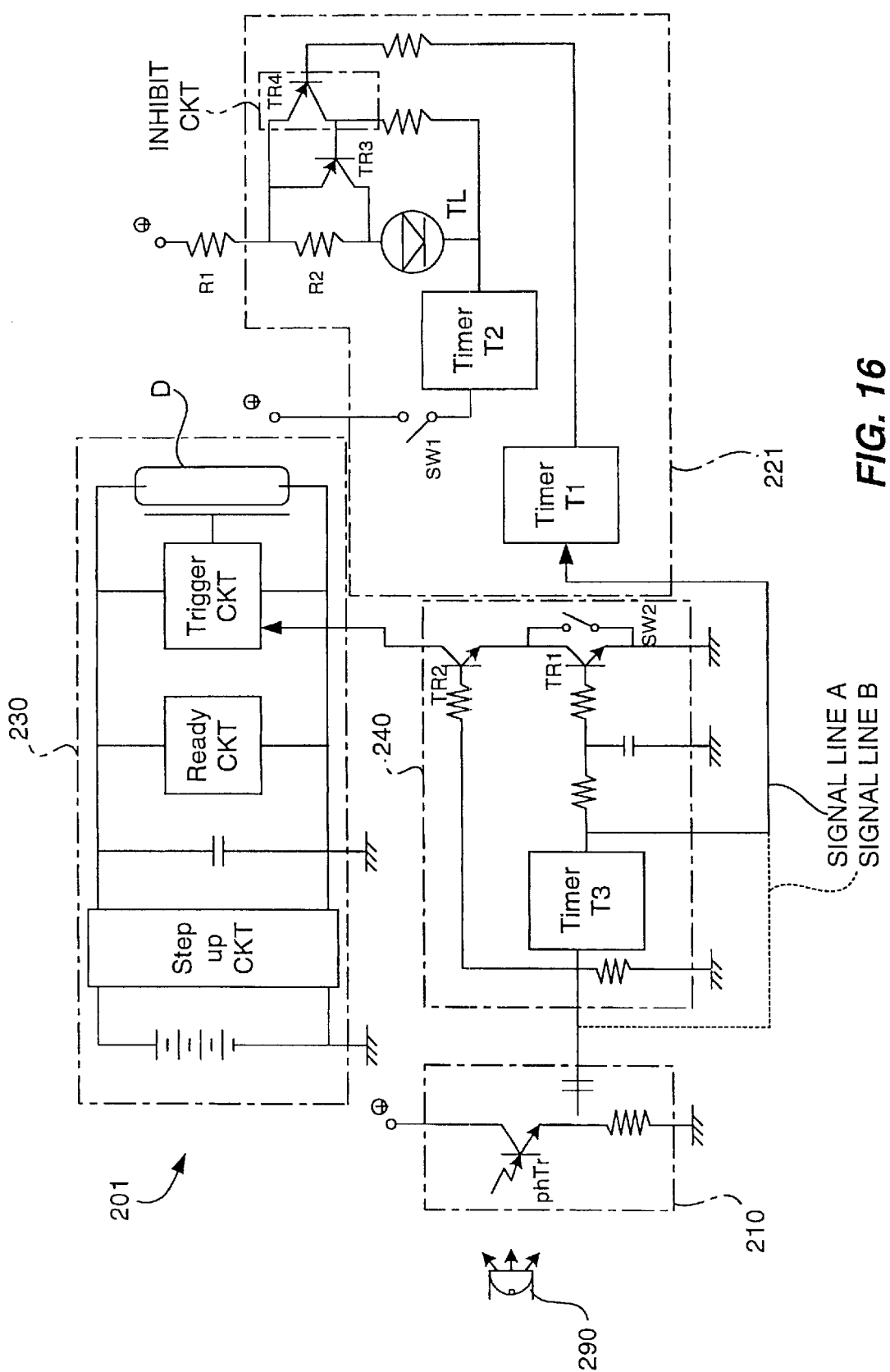
FIG. 16 is a diagram of another control circuit embodying this invention.

FIG. 16 shows another control circuit 201 which is different from the circuit 200 shown in FIG. 14 in that its target light control circuit 221 serves to merely darken the target light TL, instead of completely switching it off. Prior to the preliminary light emission of the internally provided flash lamp 290, reset switch SW1 and timer T2 remain switched on to keep transistor TR3 in the switched-on condition such that only resistor R1 is connected in series to the target light TL. The target light TL is then of normal brightness. When the internally provided flash lamp 290 undergoes the preliminary light emission, transistor TR4 is switched on as timer T1 is switched on, and since transistor TR3 becomes switched off, both resistors R1 and R2 come to be connected in series to the target light TL, thereby reducing the brightness of the target light TL without extinguishing it. The total resistance of this series connection is determined such that the reduced intensity of the target light TL will be low enough not to adversely affect the quality of the picture to be taken by the exposure even if the light of the reduced brightness enters through the lens. This reduced-light condition continues until timer T1 becomes switched off, or at least until the shutter is completely closed again. As timer T1 is switched off, it becomes resistor R1 alone that remains connected to the target light TL in series, and the target light TL returns to its original brightness. In summary, the reduced-light condition of the target light TL is controlled by using the preliminary light emission of the internally provided flash lamp 290 as the trigger.

Figure 17:
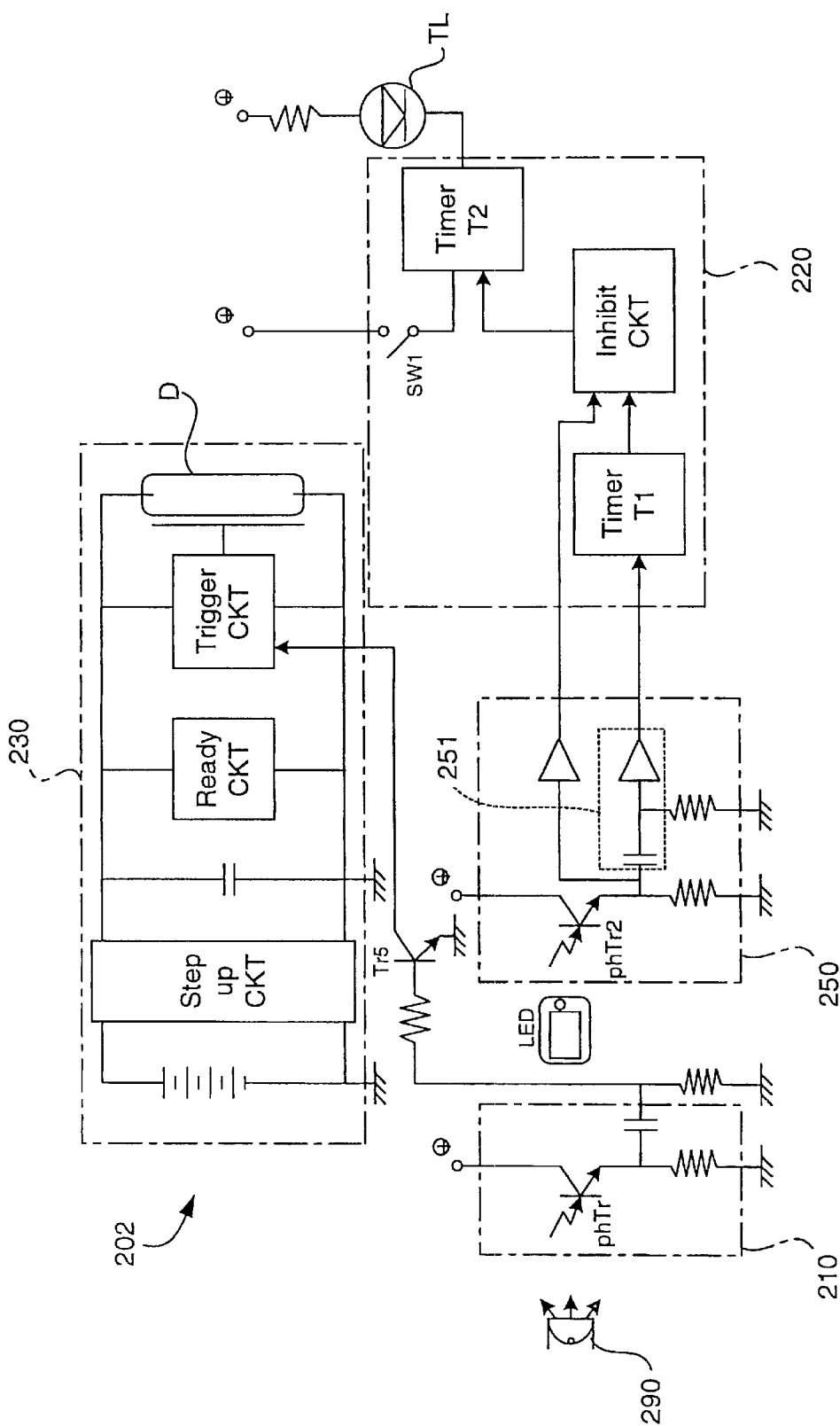
FIG. 17 is a diagram of still another control circuit embodying this invention.

FIG. 17 shows still another control circuit 202 for controlling the reduced-light condition of the target light TL by detecting indicator light from an LED which may be provided adjacent to the finder of the camera for indicating the ready condition by emitting light. This control circuit 202 may be characterized as comprising an LED light detecting circuit 250 including phototransistor PhTr2 serving as means for detecting light from the LED and a target light control circuit 220 having timers T1 and T2 (like the corresponding control circuit shown in FIG. 14 at 220). Thus, as explained above with reference to FIG. 14, the target light TL is initially switched on because reset switch SW1 of the target light control circuit 220 keeps timer T1 switched on. When the shutter button is pressed to the half-way position, say, to indicate that the automatic focussing procedure has been completed and that the camera is ready to be clicked, the LED emits light, which is detected by phototransistor PhTr2. The detection signal from phototransistor PhTr2 is received through an inhibitor circuit 421 by timer T2 which becomes switched off thereby, and the target light TL is extinguished.

As shown in FIG. 17, the LED light detecting circuit 250 includes a differential circuit 251 for analyzing the output from the LED which becomes extinguished before the shutter begins to open (as indicated by broken line in FIG. 13). This differential circuit 251 serves to detect the drop of LED light intensity, and a detection signal from the differential circuit 251 causes timer T1 to be switched on such that the switched-off condition of the target light TL continues at least until the shutter is closed.

As for the externally provided flash lamp 230, phototransistor PhTr of flash detecting circuit 210 detects the main light emission of the internally provided flash lamp 290, and the detection signal is transmitted through transistor TR5 to the externally provided flash lamp 230, causing its discharge tube D to emit flash light in synchronism with the main light emission of the internally provided flash lamp 290.

The circuit shown in FIG. 17 may be changed in the same manner as that of FIG. 14 was changed to provide the circuit shown in FIG. 16 for obtaining a corresponding circuit for merely darkening the target light TL, instead of extinguishing it.

In what follows, the invention will be described further in detail in terms of physical arrangements of various components.

FIG. 19 shows a digital camera (itself not visible) equipped with an internally provided flash lamp contained inside a waterproof housing 10 and a container 11 containing an externally provided flash lamp, supported by an arm member 12 and attached to the waterproof housing 10. The container 11 contains not only discharge tubes 111 (symbolically shown as D above) as flash sources but also a target light source 112 (shown as TL above). Although not shown in FIG. 19, the aforementioned circuits 230 and 240 for operating and controlling the externally provided flash lamp are also contained inside this container 11 such that the discharge tubes 111 can emit light in synchronism with the flash light emitted from the internally provided flash light of the digital camera.

Flash light emitted from the internally provided flash lamp is initially dispersed by means of a light dispersing means 101 inside the housing 10 and then propagated out. This dispersed flash light is detected by a light detector 13. As shown more in detail in FIGS. 20A and 20B as an example, the light detector 13 comprises a light receiving part 131 including a transparent or semi-transparent window through which the flash light is received and a phototransistor 132 for detecting the received flash light. It is detachably attached to a side surface of the arm member 12. A certain gap is maintained between the arm member 12 and the light detector 13 such that the dispersed flash light passes through this gap to reach the light receiving part 131.

The light detector 13 also includes an LED 133 adapted to emit light in response to a detection signal emitted by the phototransistor 132 when flash light is thereby detected. An optical fiber 14 is connected to one end of this LED 133 for transmitting light from the LED 133. In other words, the flash light received by the light receiving part 131 is converted into LED light by means of the phototransistor 132 and the LED 133 to be transmitted through the optical fiber 14. The other end of the optical fiber 14 is connected to the container 11 for the externally provided flash lamp through a connector 15 containing a phototransistor (not shown). The light transmitted from the light detector 13 through the optical fiber 14 is detected by the phototransistor inside the connector 15, and its detection signal is transmitted to the control circuit 230 for the control of the externally provided flash lamp. As described above, the circuits 230 and 240 for the control and operation of the externally provided flash lamp causes emission of flash light from the discharge tubes 111 in synchronism with the flash light emission of the internally provided flash lamp.

If the internally provided flash lamp for the digital camera in FIG. 19 is of the type which emits flash light twice, the phototransistor 132 of the light detector 13 will detect both the preliminary light emission and the main light emission. In this situation, it is the preliminary light emission detected first that is used as the trigger for switching off or darkening the target light 112.

The circuit for the phototransistor 132 contained in the light detector 13 is essentially an equivalent of the control circuit shown in FIG. 14. The target light control circuit, such as shown at 220 in FIG. 14, may be included either in the light detector 13 or the container 11. If it is contained in the container 11 (although not shown in FIG. 19), the preliminary light emission is first converted into the LED light signal by the light detector 13 and then transmitted through the optical fiber 14 to the connector 15. A detection signal from the connector 15 is transmitted and switches on timer T1 in the target light control circuit inside the container 11 for the externally provided flash lamp. The target light 112 is thereafter controlled as explained above. Thus, the target light 112 is switched off before the shutter begins to open and remain extinguished at least until the shutter becomes completely closed, preventing unwanted light entering into the camera through its lens. It now goes without saying that a control circuit as shown in FIG. 16 may be used for merely darkening the target light, instead of extinguishing it.

According to the example described above, it is necessary to distinguish between the LED light serving as the trigger for the former and that for the latter because one optical fiber 14 serves to transmit the LED light from the light detector 13 to both the control circuit for the control of the externally provided flash lamp (such as shown at 240 above) and the target light control circuit inside the container 11. In other words, while the discharge tubes 111 of the externally provided flash lamp emit light twice by using the LED light as trigger if the internally provided flash lamp is operated to undergo both preliminary light emission and main light emission but it carried out only the main light emission also by using the LED light as trigger if the internally provided flash lamp emits light only once, the control of the target light 112 to switch it off or to make it dark is effected by using as the trigger only the LED light generated by the preliminary light emission of the internally provided flash lamp. Thus, a correct and dependable control of the target light 112 is not possible unless it is made clear whether the light received from the LED was derived from the preliminary light emission or from the main light emission of the internally provided flash lamp. A method has been proposed by one of the inventors herein (described in Japanese Patent Application (Tokugan) 11-205426) whereby the aforementioned two light signals from the LED are distinguished by comparing their magnitudes. The light signals from the LED can be accurately characterized by this method.

If the internally provided flash lamp carries out only the main light emission, it is necessary to detect the signal light from the LED indicating that the camera is ready to be clicked, as explained above. This may be done by redesigning the light detector 13 and attaching it to the waterproof housing 10 at a position from where it is easy to receive the light from the LED which is usually positioned adjacent to the finder or the liquid crystal display device. When the light detector 13 thus redesigned receives a light signal which is emitted from the LED for indicating the ready status of the camera, it converts the signal light into a stronger LED signal and transmits it to the externally provided flash lamp through the connector 15 and the optical fiber 14. The target light control circuit inside the container 11 thereby operates to switch off or darken the target light 112.

The differential circuit 260, shown in FIG. 17, may also be placed inside the container 11 for detecting the light from the LED being switched off such that timer T1 will be switched on to keep the target light 112 switched off at least until the shutter is closed, as explained above.

Figure 21:
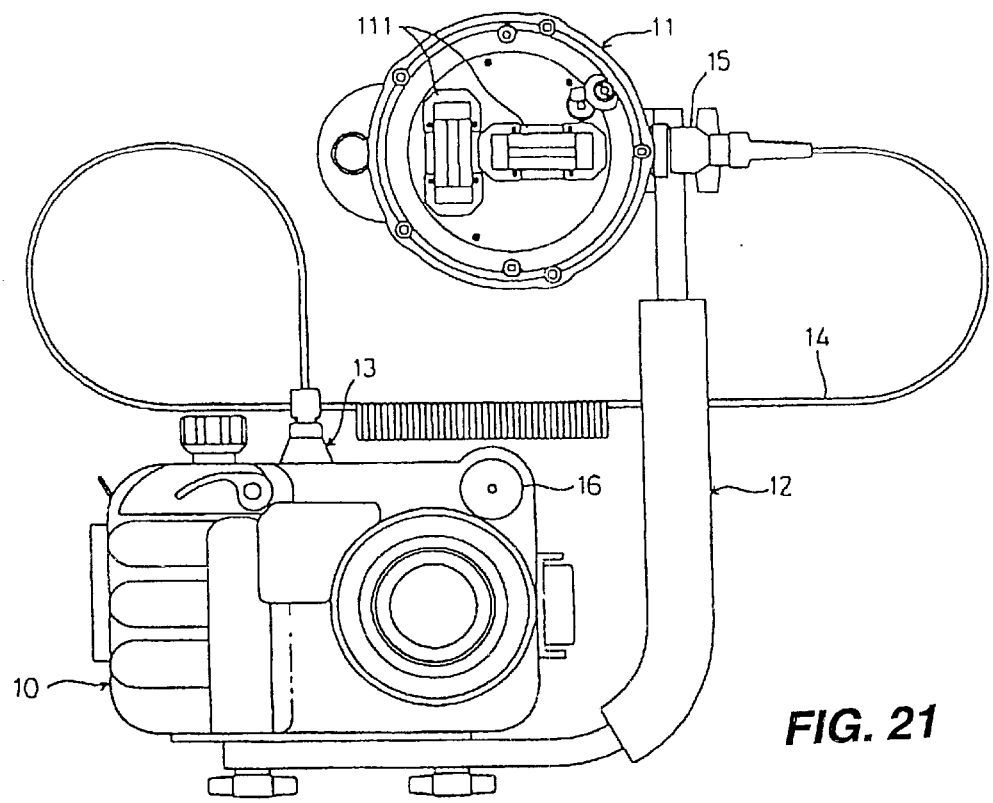
FIG. 21 is a front view of another system for underwater photography incorporating flash lamps embodying this invention.
Figure 22:
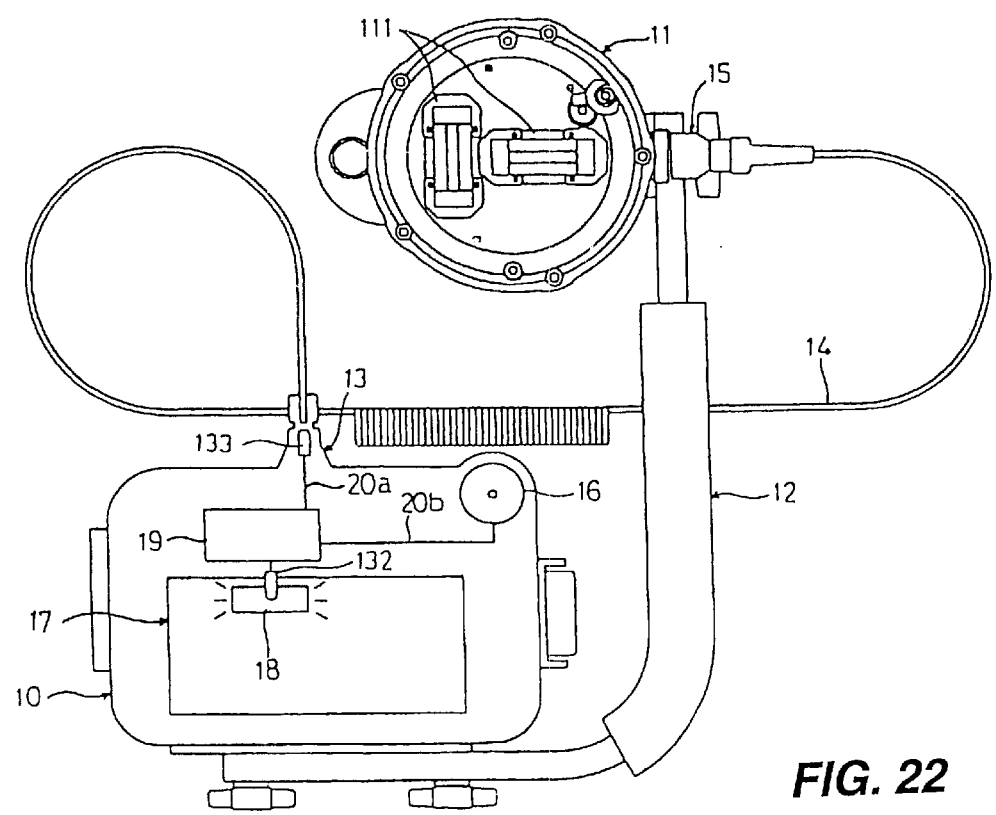
FIG. 22 is a front view for showing the interior of the camera housing shown in FIG. 21.

The examples described above with reference to FIG. 19 are characterized in that the target light 112 is set inside the container 11 together with the discharge tubes 111 of the externally provided flash lamp. FIGS. 21 and 22 show another embodiment of this invention characterized wherein a target light 16 is incorporated in the waterproof housing 10. In order to control this target light 16 by detecting the preliminary light emission of the internally provided flash lamp 18 of the digital camera 17, the light detector 13 is attached to the waterproof housing and its phototransistor 132 is positioned such that light from the internally provided flash lamp 18 can be easily detected, as shown in FIG. 22.

In this application, the detection of light by this phototransistor 132 may be used not only for the control of the target light 16 but also for the control of the discharge tubes 111 of the externally provided flash lamp. Thus, its control circuit 19 serves to transmit its detection signals both to the target light 16 and to the discharge tubes 111 of the externally provided flash lamp. Explained more in detail, the detection signal from the phototransistor 132 is transmitted, on one hand, to LED 133 inside the light detector 13 through signal line 20*a* and a corresponding light signal from the LED 133 is outputted to the container 11 outside through the optical fiber 14 and the connector 15. On the other hand, the detection signal from the phototransistor 132 is processed within the control circuit 19 into a control signal and outputted through signal line 20*b* to the target light 16 which is thereby switched off or darkened, as explained above. The function of the control circuit 19 is to distinguish between preliminary light emission and main light emission and to output a control signal to the target light 16 only when the detection signal was in response to preliminary light emission. For this distinction, either the method described above with reference to FIG. 19 or the method according to aforementioned Japanese Patent Application (Tokugan) 11-205426 may be employed.

Thus, the target light 16 incorporated in the waterproof housing 10 can also be controlled to be switched off or darkened before the shutter begins to open and to remain in this switched-off or darkened condition until the shutter is completely closed.

Although the invention has been described above only by way of a limited number of examples, these examples are not intended to limit the scope of the invention. Many modifications and variations are possible within the scope of the invention. For example, when the target light is controlled by using as trigger the light emitted from an LED which may be positioned adjacent to the finder, two separate phototransistors (instead of a single one indicated by numeral 132) may be provided so as to be convenient for receiving light from the LED, one serving to transmit a signal through signal line 20a and the other through signal line 20b.

In general, the disclosure and the claims section are intended to be interpreted broadly, especially since there are many different types of cameras already commonly available and new kinds, such as underwater digital cameras not requiring a separate waterproof housing, may become available in near future. Expressions related to the shutter, such as opening and closing the shutter are also intended to be interpreted broadly because there are cameras which do not include a shutter of a conventional kind with a shutter screen adapted to open and close but make use of CCD light receiving elements which carry out the functions of a shutter in the traditional sense of the word. In other words, the expression "shutter" itself, within the context of the present invention, is intended to be interpreted as including any electronically controlled device adapted to carry out the functions of ordinary shutters.

As for the timers which have been frequently mentioned in the specification, they were described mostly as being incorporated in one or another of the components which together form a system for underwater flash photography. It was mostly because of the convenience of description, however, and the position of the timer to be incorporated in such a system is not intended to limit the scope of the invention. Generally, timers used in connection with the present invention may be inside the flash lamp, outside the flash lamp (inside the housing for the camera) or incorporated in the camera.

The devices and methods of the present invention are intended, and believed, to be usable in combination with most, if not literally all, of these many kinds of present and future cameras. This is one of the reasons that the language in this disclosure and the claims section must be interpreted broadly.

On the other hand, some expressions used in this document must be interpreted in a strict sense whenever a definition has been given. In particular, the expression "target light", used throughout herein, must be interpreted according to the definition given above, namely, any focussed light, other than the flash light for the flash photography, for making it easier for the user to visually ascertain where the flash light is pointed and/or other conditions around. Laser diodes and strongly focussed LEDs are preferred examples of the target light to be included in a flash lamp embodying this invention. Control devices and methods, both disclosed and claimed herein, for such a flash lamp are applicable even if the target light to be controlled thereby comprises an ordinary light bulb, instead of a laser diode or a focussed LED. The intended scope of the invention should thus be understood.

In the general spirit of broadly interpreting the language, and especially the language used in the claims section, the expressions related to making the target light darker or darkening the target light are intended to include totally switching off the target light. Similarly, expression "darkened condition" related to the target light is intended to include the condition under which the target is totally extinguished. This should be clear because any light becomes darker when it is extinguished, although totally switching off a light and merely making it darker without totally extinguishing it have been treated as two different alternatives in the specification for the convenience of disclosure.

What is claimed is:

1. A flash lamp for underwater photography for use in combination with a camera, said camera having a shutter, a shutter button for opening said shutter, an X-contact which is normally open and closes in coordination with said shutter as said shutter opens and a finder which defines a field of vision, said flash lamp comprising:
    a flash light source defining an optical axis for emitting flash light along said optical axis;
    a target light for emitting light along said optical axis in coordination with said flash light, said target light being focussed such that an area less than ¼ of said field of vision is illuminated thereby; and
    means for automatically darkening said target light in response to a signal received no later than approximately when said X-contact is closed.

2. The flash lamp of claim 1 wherein said target light comprises a laser diode.

3. The flash lamp of claim 1 wherein said target light comprises an LED with converging means for converging light emitted from said LED.

4. The flash lamp of claim 1 further comprising at least one target-light lighting mechanism selected from the group consisting of a mechanism for lighting said target light approximately simultaneously as when said flash lamp has been charged, another mechanism for lighting said target light when a half-pushed-in signal indicating that said shutter button of said camera has been pushed in to a half-way position has been received, and still another mechanism for lighting said target light in coordination with a timer.

5. The flash lamp of claim 2 further comprising at least one target-light lighting mechanism selected from the group consisting of a mechanism for lighting said target light approximately simultaneously as when said flash lamp has been charged, another mechanism for lighting said target light when a half-pushed-in signal indicating that said shutter button of said camera has been pushed in to a half-way position has been received, and still another mechanism for lighting said target light in coordination with a timer.

6. The flash lamp of claim 3 further comprising at least one target-light lighting mechanism selected from the group consisting of a mechanism for lighting said target light approximately simultaneously as when said flash lamp has been charged, another mechanism for lighting said target light when a half-pushed-in signal indicating that said shutter button of said camera has been pushed in to a half-way position has been received, and still another mechanism for lighting said target light in coordination with a timer.

7. The flash lamp of claim 1 further comprising at least one energy-saving mechanism selected from the group consisting of an energy-saving mechanism for lighting said target light after said flash lamp has been charged and a half-pushed-in signal indicating that said shutter button of said camera has been pushed in to a half-way position has been received and another energy-saving mechanism for lighting said target light after said flash lamp has been charged and when a timer signal from a timer has been received.

8. The flash lamp of claim 2 further comprising at least one energy-saving mechanism selected from the group consisting of an energy-saving mechanism for lighting said target light after said flash lamp has been charged and a half-pushed-in signal indicating that said shutter button of said camera has been pushed in to a half-way position has been received and another energy-saving mechanism for lighting said target light after said flash lamp has been charged and when a timer signal from a timer has been received.

9. The flash lamp of claim 3 further comprising at least one energy-saving mechanism selected from the group consisting of an energy-saving mechanism for lighting said target light after said flash lamp has been charged and a half-pushed-in signal indicating that said shutter button of said camera has been pushed in to a half-way position has been received and another energy-saving mechanism for lighting said target light after said flash lamp has been charged and when a timer signal from a timer has been received.

10. The flash lamp of claim 4 further comprising at least one energy-saving mechanism selected from the group consisting of an energy-saving mechanism for lighting said target light after said flash lamp has been charged and a half-pushed-in signal indicating that said shutter button of said camera has been pushed in to a half-way position has been received and another energy-saving mechanism for lighting said target light after said flash lamp has been charged and when a timer signal from a timer has been received.

11. The flash lamp of claim 5 further comprising at least one energy-saving mechanism selected from the group consisting of an energy-saving mechanism for lighting said target light after said flash lamp has been charged and a half-pushed-in signal indicating that said shutter button of said camera has been pushed in to a half-way position has been received and another energy-saving mechanism for lighting said target light after said flash lamp has been charged and when a timer signal from a timer has been received.

12. The flash lamp of claim 6 further comprising at least one energy-saving mechanism selected from the group consisting of an energy-saving mechanism for lighting said target light after said flash lamp has been charged and a half-pushed-in signal indicating that said shutter button of said camera has been pushed in to a half-way position has been received and another energy-saving mechanism for lighting said target light after said flash lamp has been charged and when a timer signal from a timer has been received.

13. The flash lamp of claim 1 further comprising a connector for connecting to an optical signal cable, said flash lamp and said camera exchanging optical signals through said optical signal cable.

14. The flash lamp of claim 2 further comprising a connector for connecting to an optical signal cable, said flash lamp and said camera exchanging optical signals through said optical signal cable.

15. The flash lamp of claim 3 further comprising a connector for connecting to an optical signal cable, said flash lamp and said camera exchanging optical signals through said optical signal cable.

16. The flash lamp of claim 4 further comprising a connector for connecting to an optical signal cable, said flash lamp and said camera exchanging optical signals through said optical signal cable.

17. The flash lamp of claim 5 further comprising a connector for connecting to an optical signal cable, said flash lamp and said camera exchanging optical signals through said optical signal cable.

18. The flash lamp of claim 6 further comprising a connector for connecting to an optical signal cable, said flash lamp and said camera exchanging optical signals through said optical signal cable.

19. The flash lamp of claim 7 further comprising a connector for connecting to an optical signal cable, said flash lamp and said camera exchanging optical signals through said optical signal cable.

20. The flash lamp of claim 8 further comprising a connector for connecting to an optical signal cable, said flash lamp and said camera exchanging optical signals through said optical signal cable.

21. The flash lamp of claim 9 further comprising a connector for connecting to an optical signal cable, said flash lamp and said camera exchanging optical signals through said optical signal cable.

22. The flash lamp of claim 10 further comprising a connector for connecting to an optical signal cable, said flash lamp and said camera exchanging optical signals through said optical signal cable.

23. The flash lamp of claim 11 further comprising a connector for connecting to an optical signal cable, said flash lamp and said camera exchanging optical signals through said optical signal cable.

24. The flash lamp of claim 12 further comprising a connector for connecting to an optical signal cable, said flash lamp and said camera exchanging optical signals through said optical signal cable.

25. A method of controlling a flash lamp with a target light for use in underwater photography in combination with a digital camera, said method comprising the steps of:
    causing said flash lamp to undergo preliminary flash light emission prior to main flash light emission each time a shutter of said camera is opened; and
    darkening said target light to a darkened condition by using said preliminary flash emission as a trigger before said shutter begins to open.

26. The method of claim 25 further comprising the step of keeping said target light in said darkened condition at least until said shutter is closed.

27. A method of controlling a flash lamp with a target light for use in underwater photography in combination with a digital camera having a shutter and a shutter button for completely pressing down to open said shutter, said camera including means for outputting a ready signal when said shutter button is pressed to a half-way position prior to being completely pressed down, said method comprising the steps of:
    causing said flash lamp to undergo main flash light emission each time a shutter for said camera is opened without any preliminary flash light emission prior to said main flash light emission; and
    darkening said target light to a darkened condition by using said ready signal as a trigger.

28. The method of claim 27 further comprising the step of keeping said target light in said darkened condition at least until said shutter is closed.

29. A device for controlling a flash lamp with a target light for use in underwater photography in combination with a digital camera, said flash lamp being adapted to undergo preliminary flash light emission prior to main flash light emission each time a shutter of said camera is opened; said device comprising:
    control means for darkening said target light to a darkened condition by using said preliminary flash emission as a trigger before said shutter begins to open.

30. The device of claim 29 wherein said control means further serves to keep said target light in said darkened condition at least until said shutter is closed.

31. A device for controlling a flash lamp with a target light for use in underwater photography in combination with a digital camera having a shutter and a shutter button for completely pressing down to open said shutter, said camera including means for outputting a ready signal when said shutter button is pressed to a half-way position prior to being completely pressed down, said flash lamp being adapted to undergo main flash light emission each time said shutter is opened without any preliminary flash light emission; said device comprising:

detecting means for detecting said ready signal and outputting a detection signal when said ready signal is detected; and control means for darkening said target light to a darkened condition when said detection signal is received.

32. The device of claim 31 wherein said control means further serves to keep said target light in said darkened condition at least until said shutter is closed.

* * * * *